US010881996B2

(12) United States Patent
Suzuki et al.

(10) Patent No.: US 10,881,996 B2
(45) Date of Patent: *Jan. 5, 2021

(54) SWIRLING FLOW GENERATOR FOR GAS-LIQUID SEPARATION

(71) Applicant: USUI CO., LTD., Shizuoka (JP)

(72) Inventors: Tetsunobu Suzuki, Shizuoka (JP); Hidetaka Ito, Shizuoka (JP); Yoshiyuki Serizawa, Shizuoka (JP)

(73) Assignee: USUI CO., LTD., Shizuoka (JP)

( * ) Notice: Subject to any disclaimer, the term of this patent is extended or adjusted under 35 U.S.C. 154(b) by 337 days.

This patent is subject to a terminal disclaimer.

(21) Appl. No.: 16/062,565

(22) PCT Filed: Dec. 8, 2016

(86) PCT No.: PCT/JP2016/086532
§ 371 (c)(1),
(2) Date: Jun. 14, 2018

(87) PCT Pub. No.: WO2017/104532
PCT Pub. Date: Jun. 22, 2017

(65) Prior Publication Data
US 2018/0361289 A1    Dec. 20, 2018

(30) Foreign Application Priority Data

Dec. 17, 2015 (JP) .................................. 2015-246467

(51) Int. Cl.
*B01D 45/12*         (2006.01)
*F02M 35/10*        (2006.01)
(Continued)

(52) U.S. Cl.
CPC ............ *B01D 45/12* (2013.01); *B01D 45/16* (2013.01); *B04C 3/02* (2013.01); *B04C 3/06* (2013.01);
(Continued)

(58) Field of Classification Search
CPC .......... B01D 45/12; B01D 45/16; B04C 3/06; B04C 2003/006; F02M 35/10
See application file for complete search history.

(56) References Cited

U.S. PATENT DOCUMENTS 1,735,298 A    11/1929   Pfeffer
2,245,536 A     6/1941   Thurman
(Continued)

FOREIGN PATENT DOCUMENTS

BR        PI0707546-4       5/2011
BR      10 2013 027788      6/2015
(Continued)

OTHER PUBLICATIONS

International Search Report dated Feb. 7, 2017 in International (PCT) Application No. PCT/JP2016/086532.
(Continued)

*Primary Examiner* — Dung H Bui
(74) *Attorney, Agent, or Firm* — Wenderoth, Lind & Ponack, L.L.P.

(57) ABSTRACT

A swirling flow generator for gas-liquid separation includes a swirling flow generating ribbon for swirling a gas-liquid two-phase fluid flowing through a pipe to guide a liquid toward an inner surface of the pipe by centrifugal force. A terminal end of the swirling flow generating ribbon where the gas-liquid two-phase fluid is to flow out includes a first terminal edge and a second terminal edge. The first and second terminal edges connect a first terminal end point, a second terminal end point, and a middle terminal end point. The first terminal end point is in a first of radially outward ends and the second terminal end point is in a second of the radially outward ends. The middle terminal end point is
(Continued)

closer to a side where the gas-liquid two-phase fluid is to flow in than the first and second terminal end points and is on an axial line.

5 Claims, 12 Drawing Sheets

(51) Int. Cl.
| | | |
|---|---|---|
| *F02M 26/50* | (2016.01) | |
| *F02M 26/35* | (2016.01) | |
| *B01D 45/16* | (2006.01) | |
| *B04C 3/02* | (2006.01) | |
| *B04C 3/06* | (2006.01) | |
| B04C 3/00 | (2006.01) | |
| F02M 26/05 | (2016.01) | |
| F02M 26/22 | (2016.01) | |
| F02M 26/06 | (2016.01) | |

(52) U.S. Cl.
CPC ............ *F02M 26/35* (2016.02); *F02M 26/50* (2016.02); *F02M 35/10* (2013.01); B04C 2003/006 (2013.01); F02M 26/05 (2016.02); F02M 26/06 (2016.02); F02M 26/22 (2016.02); Y02T 10/12 (2013.01)

(56) References Cited

U.S. PATENT DOCUMENTS

| | | | |
|---|---|---|---|
| 3,433,361 A | 3/1969 | Ades | |
| 3,517,821 A | 6/1970 | Monson et al. | |
| 3,713,279 A | 1/1973 | Moore | |
| 3,813,854 A | 6/1974 | Hortman | |
| 4,008,059 A | 2/1977 | Monson et al. | |
| 4,162,906 A | 7/1979 | Sullivan et al. | |
| 4,180,391 A | 12/1979 | Perry, Jr. et al. | |
| 4,187,089 A | 2/1980 | Hodgson | |
| 4,289,611 A | 9/1981 | Brockmann | |
| 4,311,494 A | 1/1982 | Conner et al. | |
| 4,622,048 A * | 11/1986 | Roberts .................. | F25B 43/02 55/452 |
| 4,971,603 A * | 11/1990 | Prinsloo .................... | B04C 3/06 95/269 |
| 4,976,748 A | 12/1990 | Prinsloo et al. | |
| 5,320,654 A * | 6/1994 | Minami ................. | B01D 45/04 55/347 |
| 5,403,367 A | 4/1995 | De Villiers et al. | |
| 6,540,802 B2 | 4/2003 | Trautmann et al. | |
| 6,540,917 B1 | 4/2003 | Rachels et al. | |
| 6,752,845 B2 | 6/2004 | Haland | |
| 6,958,107 B1 | 10/2005 | Clarke et al. | |
| 7,743,742 B2 | 6/2010 | Wagner et al. | |
| 7,835,483 B2 * | 11/2010 | Chaki .................... | B01D 45/16 376/370 |
| 8,043,394 B2 | 10/2011 | Mital et al. | |
| 8,425,641 B2 * | 4/2013 | Chaudhari ................ | B04C 3/06 55/319 |
| 8,764,886 B2 | 7/2014 | Halpap et al. | |
| 8,852,323 B2 | 10/2014 | Schook | |
| 2002/0189995 A1 | 12/2002 | Bruckmann et al. | |
| 2003/0115844 A1 | 6/2003 | Sakakibara et al. | |
| 2005/0000200 A1 * | 1/2005 | Christiansen ............. | B04C 3/06 55/456 |
| 2005/0028499 A1 | 2/2005 | Greif et al. | |
| 2005/0252837 A1 | 11/2005 | Haland | |
| 2007/0017372 A1 | 1/2007 | Fukano et al. | |
| 2008/0028757 A1 | 2/2008 | Eitel et al. | |
| 2009/0065431 A1 * | 3/2009 | Bakke ................ | B01D 17/0217 210/512.1 |
| 2010/0147021 A1 | 6/2010 | Betting et al. | |
| 2010/0275561 A1 | 11/2010 | Lundquist et al. | |
| 2011/0048696 A1 | 3/2011 | Holte | |
| 2014/0116255 A1 | 5/2014 | Pérez Guerra et al. | |
| 2014/0130467 A1 | 5/2014 | Herman et al. | |
| 2015/0047305 A1 * | 2/2015 | Altorf ....................... | B04C 3/00 55/447 |
| 2015/0290560 A1 | 10/2015 | Hoydal et al. | |
| 2015/0306528 A1 | 10/2015 | Mueller | |
| 2016/0096129 A1 | 4/2016 | Kochubel | |
| 2016/0177893 A1 | 6/2016 | Finn et al. | |
| 2017/0333918 A1 | 11/2017 | Hua et al. | |
| 2018/0250620 A1 * | 9/2018 | Vingelven .............. | B01D 45/08 |
| 2018/0369731 A1 | 12/2018 | Mueller | |

FOREIGN PATENT DOCUMENTS

| | | | | |
|---|---|---|---|---|
| CN | 1904476 | 1/2007 | | |
| CN | 101384372 | 3/2009 | | |
| CN | 102518498 | 6/2012 | | |
| DE | 17 19 485 | 9/1971 | | |
| EA | 200801867 | 12/2008 | | |
| EP | 1 745 833 | 1/2007 | | |
| EP | 2 042 223 | 4/2009 | | |
| GB | 359739 | 10/1931 | | |
| GB | 1 206 007 | 9/1970 | | |
| GB | 2507662 | 5/2014 | | |
| JP | 53-26762 | 3/1978 | | |
| JP | 56-501351 | 9/1981 | | |
| JP | 4-2839 | 1/1992 | | |
| JP | 11-83151 | 3/1999 | | |
| JP | 2003-62416 | 3/2003 | | |
| JP | 2003-190725 | 7/2003 | | |
| JP | 2005-160187 | 6/2005 | | |
| JP | 2005-199161 | 7/2005 | | |
| JP | 2006-205077 | 8/2006 | | |
| JP | 2006205077 A | * 8/2006 | ............ | F28D 7/106 |
| JP | 2007-21426 | 2/2007 | | |
| KR | 10-2007-0011182 | 1/2007 | | |
| MX | 2013012676 | 9/2014 | | |
| NL | 7920206 | 9/1981 | | |
| NL | 2011703 | 5/2014 | | |
| NO | 20131432 | 5/2014 | | |
| RU | 2013 148 376 | 5/2015 | | |
| WO | 81/01110 | 4/1981 | | |
| WO | 02/20137 | 3/2002 | | |
| WO | 03/092901 | 11/2003 | | |
| WO | 2006/045488 | 5/2006 | | |
| WO | 2007/096316 | 8/2007 | | |

OTHER PUBLICATIONS

International Search Report dated Feb. 7, 2017 in International (PCT) Application No. PCT/JP2016/086531.
First Examination Report dated Feb. 21, 2020 in corresponding Indian Application No. 201817025009, with English-language translation.
Office Action dated Apr. 9, 2020 in corresponding Chinese Patent Application No. 201680074319.6 with English-language translation.
Extended European Search Report dated Jul. 5, 2019 in European Patent Application No. 16875511.4.
Extended European Search Report dated Jul. 5, 2019 in corresponding European Patent Application No. 16875512.2.
Office Action dated Apr. 27, 2020 in U.S. Appl. No. 16/062,572.

* cited by examiner

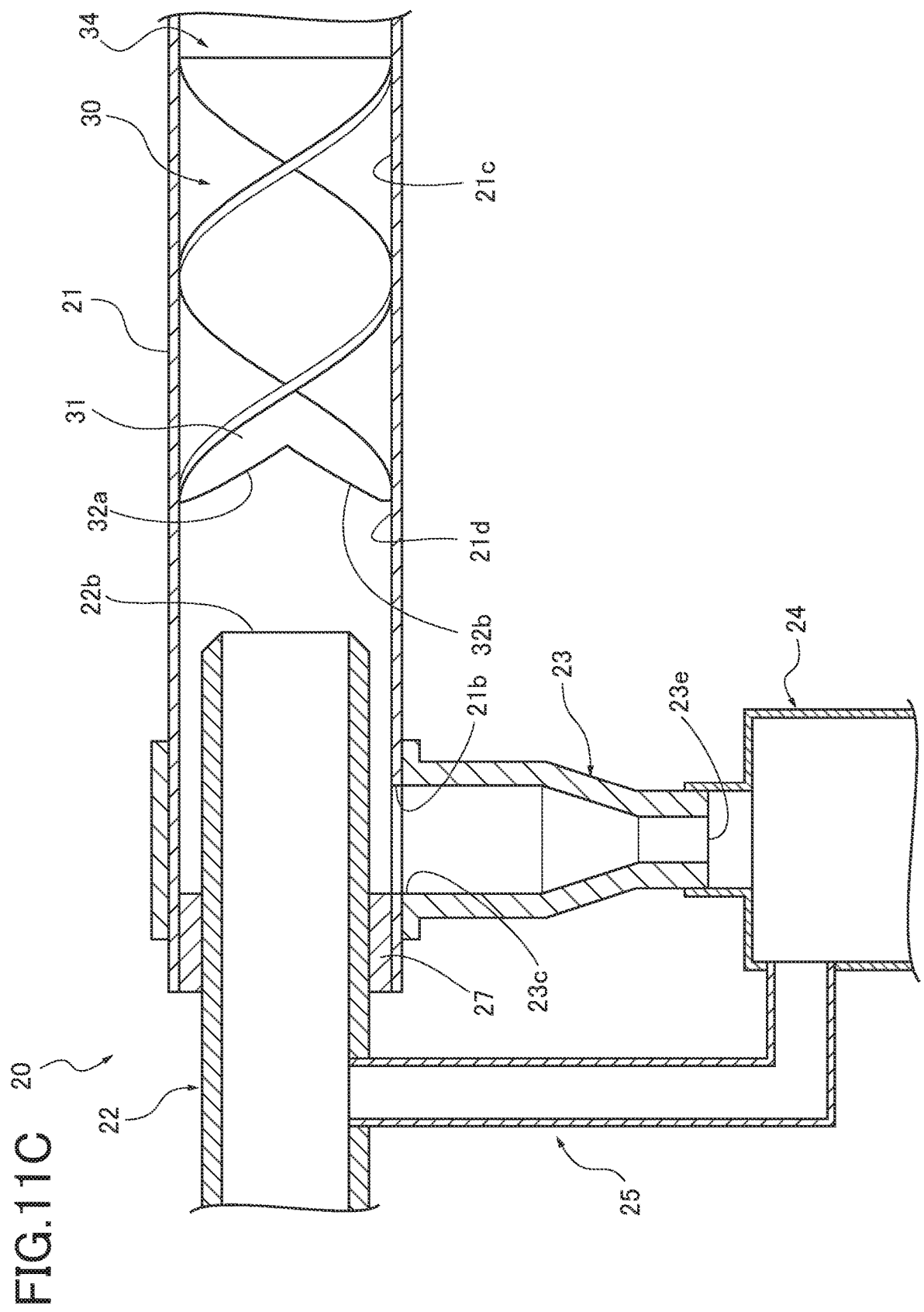

SWIRLING FLOW GENERATOR FOR GAS-LIQUID SEPARATION

CROSS-REFERENCE TO RELATED APPLICATION

This application is based upon and claims the benefit of priority from Japanese Patent Application No. 2015-246467 filed on Dec. 17, 2015, the entire disclosure of which is incorporated herein by reference.

TECHNICAL FIELD

The present disclosure generally relates to a swirling flow generator for gas-liquid separation that swirls a gas-liquid two-phase fluid flowing through a pipe by a swirling flow generating ribbon and guides liquid to an inner surface of the pipe by centrifugal force.

BACKGROUND ART

Conventionally, a swirling flow generator for gas-liquid separation that swirls a gas-liquid two-phase fluid flowing through a pipe by a swirling flow generating ribbon and guides liquid to an inner surface of the pipe by centrifugal force is known (see JP 2003-62416A and JP 2003-190725A, for example). The swirling flow generating ribbon is formed from a helically twisted plate member. In such swirling flow generators for gas-liquid separation, liquid (liquid droplets) attached to the swirling flow generating ribbon flows toward the inner surface of the pipe while attached to the outer surface of the ribbon.

SUMMARY

However, in the conventional swirling flow generator for gas-liquid separation, the terminal end of the swirling flow generating ribbon (the side end where the gas-liquid two-phase fluid flows out) includes a straight edge along the radial direction of the ribbon. Therefore, the liquid attached to portions of the swirling flow generating ribbon in the vicinity of the shaft center of the ribbon does not flow toward the inner surface of the pipe at the terminal end of the ribbon but re-scatters into the gas. As a result, the separation performance of the liquid deteriorates.

Accordingly, the present disclosure is made considering the above issues and an object of the present disclosure is to provide a swirling flow generator for gas-liquid separation that can prevent the liquid attached to the swirling flow generating ribbon from re-scattering into the gas in the terminal end of the ribbon, and can improve the separation performance of the liquid.

To achieve the above object, the present disclosure is a swirling flow generator for gas-liquid separation wherein a swirling flow generating ribbon formed from a helically twisted plate member swirls a gas-liquid two-phase fluid flowing through a pipe to guide a liquid toward an inner surface of the pipe by centrifugal force. The pipe receives the swirling flow generating ribbon. The swirling flow generating ribbon includes, in a terminal end at a side where the gas-liquid two-phase fluid flows out, a first terminal end point that is set in an end of radially outward ends of the swirling flow generating ribbon, a second terminal end point that is set in another end of radially outward ends of the swirling flow generating ribbon, a middle terminal end point that is on an axial line of the swirling flow generating ribbon and set closer to a side where the gas-liquid two-phase fluid flows in than the first terminal end point and the second terminal end point, a first terminal edge connecting the first terminal end point and the middle terminal end point, and a second terminal edge connecting the second terminal end point and the middle terminal end point.

BRIEF DESCRIPTION OF DRAWINGS

FIG. 11C is a cross sectional view illustrating a swirling flow generator according to the Third Modified Example.

DESCRIPTION OF EMBODIMENTS

Hereinafter, preferred embodiments of a swirling flow generator for gas-liquid separation according to the present disclosure will be described in accordance with the First Embodiment and the Second Embodiment illustrated in the accompanying drawings.

First Embodiment

First, the configuration of a swirling flow generator for gas-liquid separation according to the First Embodiment will be separately described under headings "Overall Configuration of System", "Detailed Configuration of Gas-Liquid Separator", and "Detailed Configuration of Swirling Flow Generating Ribbon".

Figure 1:
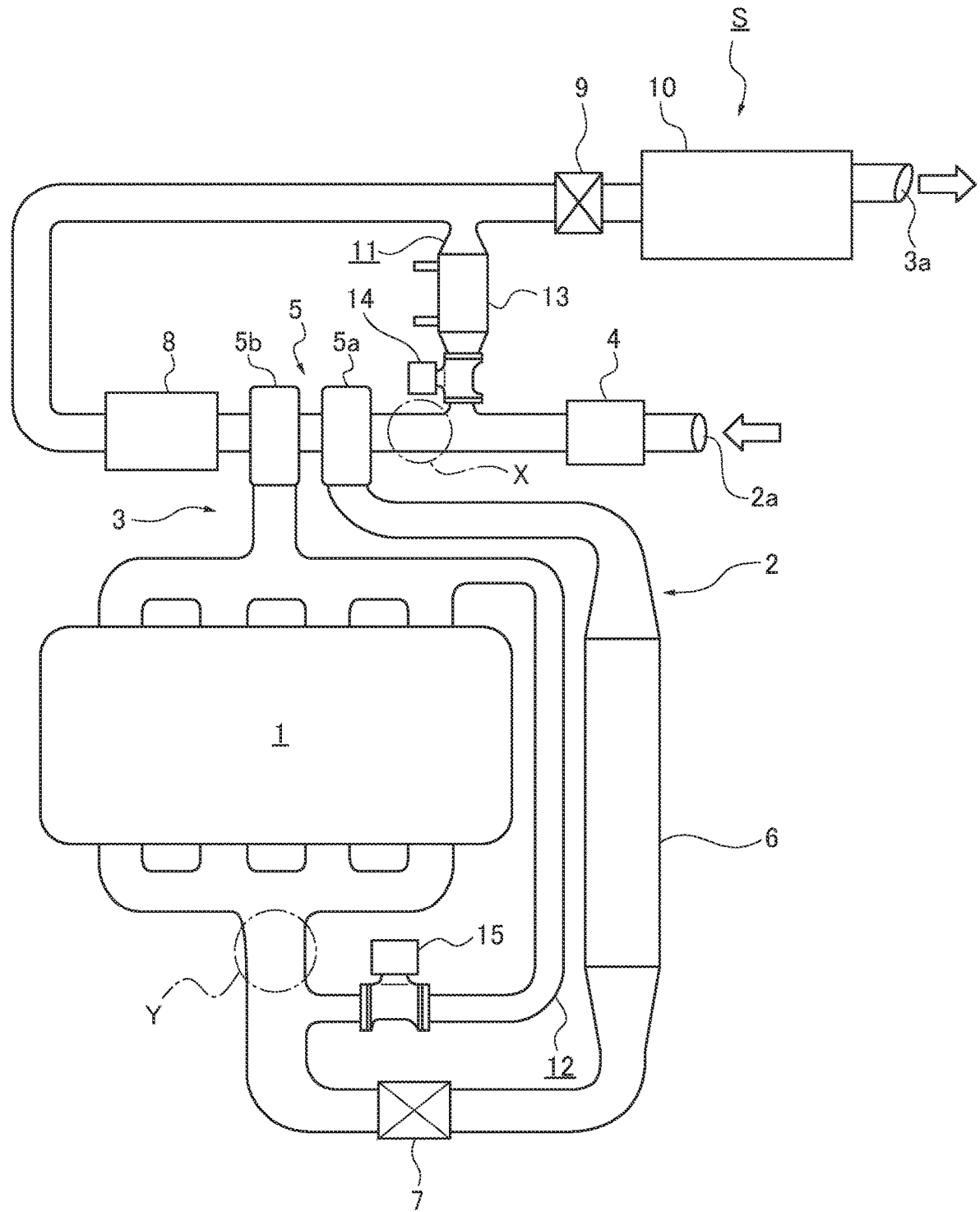
FIG. 1 is an entire system diagram illustrating an exhaust gas recirculation system of an internal combustion engine to which a swirling flow generator according to the First Embodiment is applied.

(Overall Configuration of System) FIG. 1 is an entire system diagram illustrating an exhaust gas recirculation system of an internal combustion engine to which a swirling flow generator according to the First Embodiment is applied. Hereinafter, an overall configuration of the system according to the First Embodiment will be described with reference to FIG. 1.

The swirling flow generator according to the First Embodiment is applied to an exhaust gas recirculation system S of an internal combustion engine 1 shown in FIG. 1. Here, the internal combustion engine 1 shown in FIG. 1 is a diesel engine mounted in a vehicle as a driving source for traveling, and includes four cylinders (not shown). Each of the cylinders is connected to an intake passage 2 and an exhaust passage 3.

The intake passage 2 includes an intake port 2a at an end. In order from a side where the intake port 2a is disposed, an air cleaner 4 for filtering an intake air, a compressor 5a of a turbocharger 5, and an intercooler 6 for cooling the intake air, and a throttle valve 7 for regulating an amount of the intake air are disposed. In order from a side where the internal combustion engine 1 is disposed, the exhaust passage 3 is provided with a turbine 5b of the turbocharger 5, an exhaust purification catalyst 8 for purifying an exhaust gas, and an exhaust throttle valve 9 for regulating an amount of the exhaust gas. A muffler 10 is disposed downstream of the exhaust throttle valve 9, and an exhaust port 3a is disposed downstream of the muffler 10.

The intake passage 2 is connected to the exhaust passage 3 via a low-pressure EGR passage 11 and a high-pressure EGR passage 12. Here, "EGR (Exhaust Gas Recirculation)" is a technology for taking out a part of the exhaust gas after combustion in the internal combustion engine 1 and for taking in the gas again. "EGR" is also referred to as exhaust gas recirculation.

The low-pressure EGR passage 11 connects a portion of the intake passage 2 located upstream of the compressor 5a and a portion of the exhaust passage 3 located downstream of the exhaust purification catalyst 8. On the other hand, the high-pressure EGR passage 12 connects a portion of the intake passage 2 located downstream of the compressor 5a and a portion of the exhaust passage 3 located upstream of the turbine 5b. Thereby, the low-pressure EGR passage 11 returns the exhaust gas passing through the turbine 5b to the intake air before the compressor 5a. Further, the high-pressure EGR passage turns the exhaust gas before flowing into the turbine 5b to the air passing through the compressor 5a.

The low-pressure EGR passage 11 is provided with an EGR cooler 13 for cooling the exhaust gas returning to the intake passage 2, and a low-pressure EGR valve 14 for regulating an amount of the exhaust gas returning to the intake passage 2 via the low-pressure EGR passage 11. The high-pressure EGR passage 12 is provided with a high-pressure EGR valve 15 for regulating an amount of the exhaust gas returning to the intake passage 2 via the high-pressure EGR passage 12.

The low-pressure EGR passage 11 can return the exhaust gas without reducing an amount of the exhaust gas passing through the turbine 5b of the turbocharger 5 and can effectively reduce NOx. However, the cooling in the EGR cooler 13 brings an issue of concern to generate condensed water. When the condensed water flows downstream in the form of droplets each having a certain size, the droplets may collide with the rotor blades and the like of the compressor 5a of the turbocharger 5 to give an impact to the rotor blades and the like. Therefore, in the First Embodiment, the gas-liquid separator 20 (refer to FIG. 2) to which the swirling flow generator shown in FIG. 2 is applied is provided downstream of the low-pressure EGR valve 14 and upstream of the compressor 5a of the turbocharger 5 (i.e. at a location surrounded by a dashed line X in FIG. 1) to collect and drain the condensed water.

Figure 2:
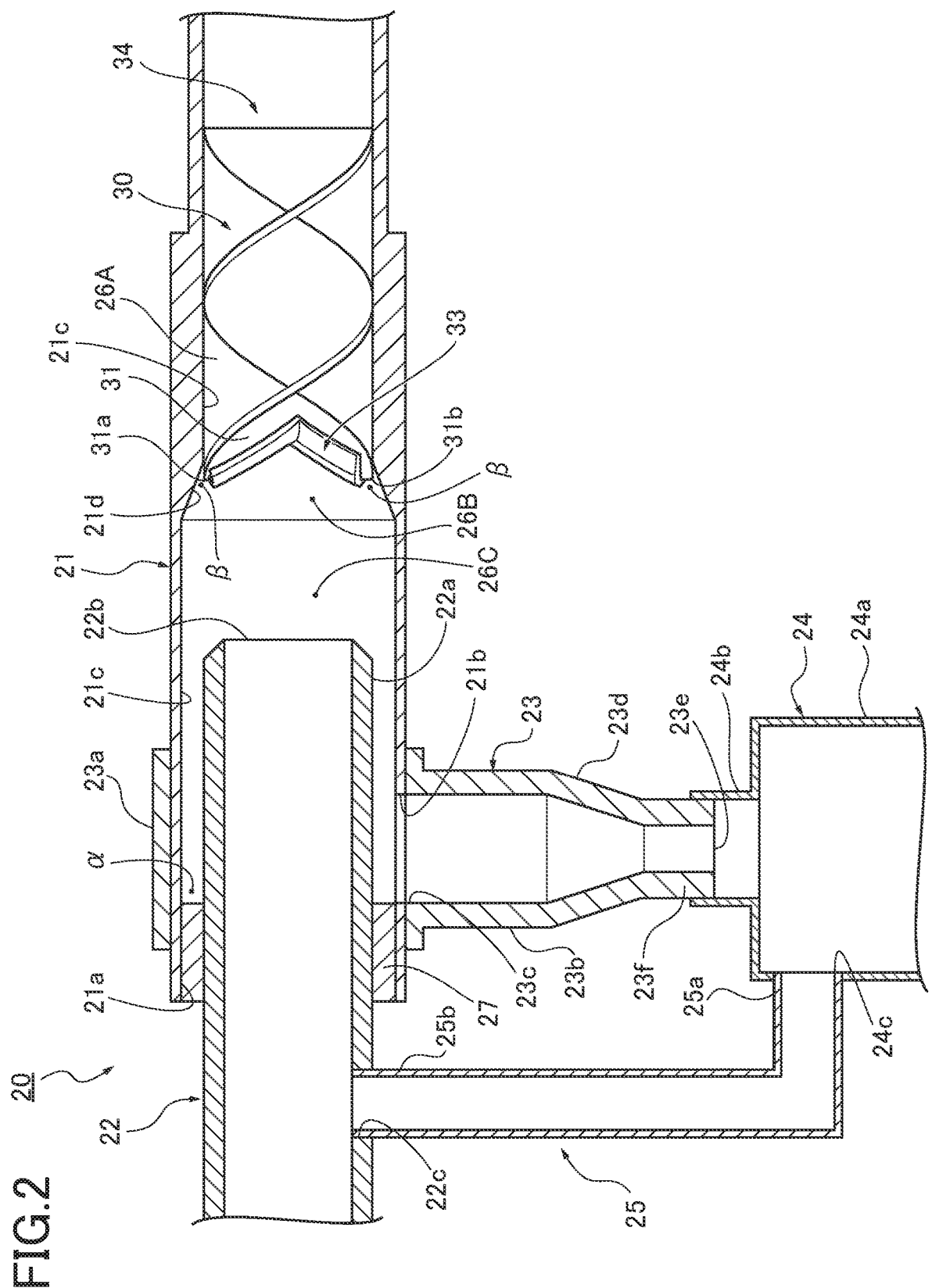
FIG. 2 is a cross sectional view illustrating the gas-liquid separator to which the swirling flow generator according to the First Embodiment is applied.

(Detailed Configuration of Gas-Liquid Separator) FIG. 2 is a cross sectional view illustrating the gas-liquid separator to which the swirling flow generator for gas-liquid separation according to the First Embodiment is applied. Hereinafter, the configuration of the gas-liquid separator in the First Embodiment will be described in detail with reference to FIG. 2.

As shown in FIG. 2, the gas-liquid separator 20 in the First Embodiment includes an inlet pipe 21 (pipe), an inner pipe 22, the drainpipe 23, a reservoir tank 24, a bypass pipe 25, and a swirling flow generating ribbon 30.

The inlet pipe 21 includes an end which is located upstream (right side in FIG. 2) in a flow direction of the gas-liquid two-phase fluid. This upstream end of inlet pipe 21 is in connection with the intake port 2a and the low-pressure EGR valve 14. The inlet pipe 21 receives an exhaust gas in the mixture of a gas and particulate liquid (condensed water) (hereinafter, referred to as "a gas-liquid two-phase fluid"). The swirling flow generating ribbon 30 is disposed within the inlet pipe 21 to swirl the flow of the gas-liquid two-phase fluid along an inner surface 21c. Further, the inlet pipe 21 includes an exhaust port 21a and a drain port 21b at a downstream end (left side in FIG. 2) in the flow direction of the gas-liquid two-phase fluid. The swirling gas flows out through the exhaust port 21a, and the liquid separated from the gas-liquid two-phase fluid flows out through the drain port 21b. The exhaust port 21a is open in an axial direction of the inlet pipe 21. The drain port 21b is open in a radial direction of the inlet pipe 21 and downward in the direction of gravity. Note that "the direction of gravity" is a direction the gravity acts, and the downward direction in FIG. 2. Further, the inner surface 21c of the inlet pipe 21 includes a tapered surface 21d which gradually increases the inner diameter of the inlet pipe 21 in the flow direction of the gas-liquid two-phase fluid. The inlet pipe 21 has a first area 26A, a second area 26B, and a third area 26C. The first area 26A is an area upstream of the flow direction of the gas-liquid two-phase fluid from the tapered surface 21d. The second area 26B is an area where the tapered surface 21d is provided. The third area 26C is an area downstream of the flow direction of the gas-liquid two-phase fluid from the tapered surface 21d. The inner diameter of the inlet pipe 21 is the smallest in the first area 26A and the gradually increases in the second area 26B. The inner diameter is the largest in the third area 26C. The swirling flow generating ribbon 30 is disposed in the first area 26A, and the exhaust port 21a and the drain port 21b are located in the third area 26C. Note that the liquid contained in the gas-liquid two-phase fluid flows into the drain port 21b by centrifugal force (turning force) generated when the gas-liquid two-phase fluid is swirling. Accordingly, the drain port 21b is open downward in the direction of gravity in the First Embodiment. However, the drain port 21b is not limited to the above but may be open in any directions.

The inner pipe 22 is a straight pipe which has an outer diameter smaller than the inner diameter of the inlet pipe 21 at the third area 26C. An end 22a of the inner pipe 22 is inserted into the exhaust port 21a of the inlet pipe 21 so that the inner pipe 22 is disposed coaxially with the inlet pipe 21. The end 22a includes an opening 22b which is open at a location downstream of the flow direction of the gas-liquid two-phase fluid from the swirling flow generating ribbon 30. Further, a downstream (left side in FIG. 2) end of the inner pipe 22 is in communication with the compressor 5a of the turbocharger 5. The opening 22b is open in an axial direction of the inner pipe 22. Specifically, the inlet pipe 21, the inner pipe 22, the exhaust port 21a, and the opening 22b are disposed coaxially with each other. In addition, the inner pipe 22 includes a vent hole 22c which is disposed in a portion of the inner pipe 22 extending from the inlet pipe 21. The vent hole 22c is open in a radial direction of the inlet pipe 21 and downward in the direction of gravity and is connected to a second end 25b of the bypass pipe 25. Note that the vent hole 22c may be open in other directions other than downward in the direction of gravity since the vent hole 22c is an opening for generating a negative pressure in the reservoir tank 24 via the bypass pipe 25.

The exhaust port 21a of the inlet pipe 21 is provided with a ring member 27 that fills a gap or clearance α between the inner surface 21c and the inner pipe 22. The ring member 27 has a cylindrical shape which is configured to surround the entire circumference of the inner pipe 22. An outer surface of the ring member 27 contacts the inner surface of the inlet pipe 21 in an airtight state, and an inner surface of the ring member 27 contacts the outer surface of the inner pipe 22 in the airtight state. Further, the ring member 27 includes an inner end which faces inward of the inlet pipe 21. The axial position of an upstream end of the ring member 27 within the inlet pipe 21 is coincident with the axial position of the downward-most portion or edge of the drain port 21b. In other words, the ring member 27 does not overlap an opening of the drain port 21b but is installed relative to the opening of the drain port 21b not to form a gap in the axial direction between the upstream end of the ring member 27 and the opening of the drain port 21b.

The drainpipe 23 is a T-shaped pipe and includes a first pipe member 23a and a second pipe member 23b. The second pipe member 23b is perpendicular to the first pipe member 23a and is connected to an axial center portion of the first pipe member 23a to form the T-shaped pipe. The inlet pipe 21 extends through the first pipe member 23a. A connection opening 23c is formed at a connection between the first pipe member 23a and the second pipe member 23b. The connection opening 23c faces the drain port 21b. Thereby, the inlet pipe 21 is in communication with the second pipe member 23b of the drainpipe 23 via the drain port 21b and the connection opening 23c. The liquid separated from the gas-liquid two-phase fluid within the inlet pipe 21 flows into the second pipe member 23b via the drain port 21b and the connection opening 23c. Here, the inner diameter of the drain port 21b has the substantially same size as the inner diameter of the connection opening 23c of the drainpipe 23. The second pipe member 23b includes a tapered diameter portion 23d which extends downward in the direction of gravity relative to the axial direction of the inlet pipe 21, and the diameter of the tapered diameter portion 23d gradually becomes smaller along the liquid flow direction. Accordingly, the inner diameter of a tip opening 23e is smaller than the inner diameters of the connection opening 23c and the drain port 21b. Note that the first pipe member 23a and the second pipe member 23b are not limited to the cylindrical pipe but may be a square pipe (square pillar pipe) or the like. In addition, the second pipe member 23b may not necessarily include the tapered diameter portion 23d, and the inner diameter of the tip opening 23e may not necessarily be smaller than the inner diameters of the connection opening 23c and the drain port 21b.

The reservoir tank 24 includes a tank body 24a disposed below the second pipe member 23b of the drainpipe 23. The tank body 24a includes a connection opening 24b formed at an upper portion thereof. The connection opening 24b is connected to a tip portion 23f of the second pipe member 23b and is in communication with the tip opening 23e. The liquid entered the second pipe member 23b flows into the tank body 24a via the tip opening 23e and the connection opening 24b to be retained in the tank body 24a. Further, the tank body 24a includes a vent hole 24c formed on a side wall of a tank upper portion. The vent hole 24c is connected to a first end 25a of the bypass pipe 25. Note that the tank body 24a includes a drain opening (not shown) which is formed at a tank bottom portion and is configured to open and close. The liquid may be discharged from the tank body 24a via the drain opening when the liquid in the tank body 24a reaches a predetermined amount. The position of the vent hole 24c is not limited to the upper portion of the tank body 24a, but the vent hole 24c may be formed in any positions as long as air within the tank body 24a can be suctioned.

The bypass pipe 25 is a pipe member both ends of which are open. The bypass pipe 25 includes a first end 25a and a second end 25b. The first end 25a of the bypass pipe 25 is connected to the vent hole 24c of the tank body 24a, and the second end 25b is connected to the vent hole 22c of the inner pipe 22. Accordingly, the bypass pipe 25 communicates an upper space of the tank body 24a with an inside of the inner pipe 22.

Figure 3:
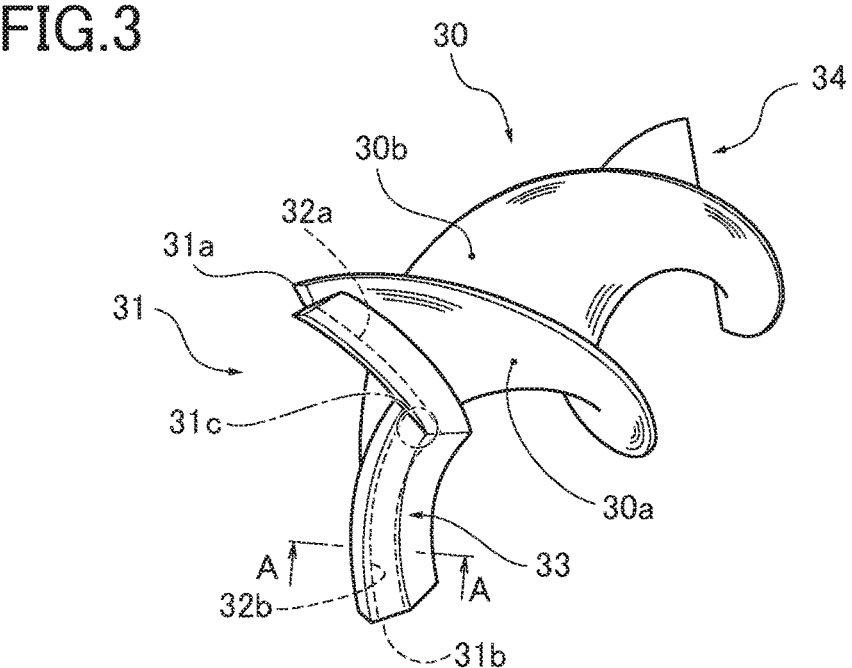
FIG. 3 is a perspective view illustrating a swirling flow generating ribbon according to the First Embodiment.
Figure 4:
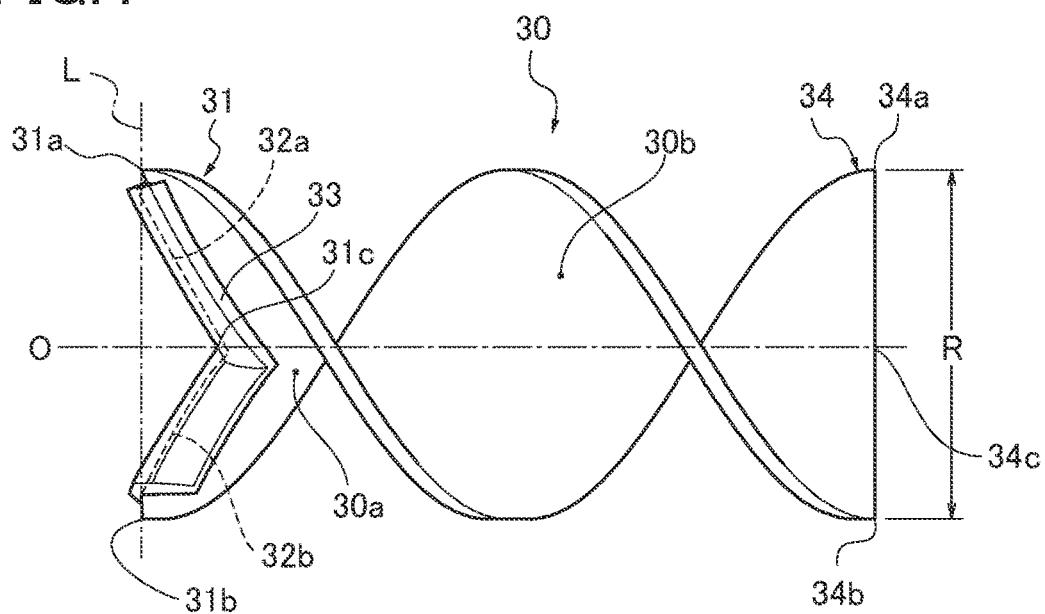
FIG. 4 is a side view illustrating the swirling flow generating ribbon according to the First Embodiment.
Figure 5:
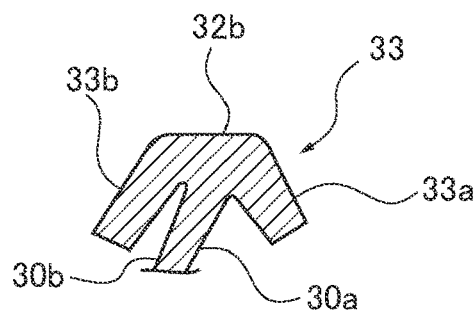
FIG. 5 is a cross sectional view along a line A-A shown in FIG. 3.

(Detailed Configuration of Swirling Flow Generating Ribbon) FIG. 3 is a perspective view illustrating the swirling flow generating ribbon according to the First Embodiment. FIG. 4 is a side view illustrating the swirling flow generating ribbon. FIG. 5 is a cross sectional view along a line A-A shown in FIG. 3. Hereinafter, the configuration of the swirling flow generating ribbon according to the First Embodiment will be described in detail with reference to FIG. 3 to FIG. 5.

The swirling flow generating ribbon 30 is formed by helically twisting a plate member in a band shape. The swirling flow generating ribbon 30 is disposed in the first area 26A of the inlet pipe 21. A radial dimension R of the swirling flow generating ribbon 30 (see FIG. 4) is set to have the substantially same size as the inner diameter of the first area 26A. The swirling flow generating ribbon 30 is disposed coaxially with the inlet pipe 21, and a peripheral edge of the swirling flow generating ribbon 30 contacts the inner surface 21c of the inlet pipe 21.

The swirling flow generating ribbon 30 includes a terminal end 31 which is located in a side where the gas-liquid two-phase fluid flows out. At the terminal end 31, the swirling flow generating ribbon 30 includes a first terminal end point 31a, a second terminal end point 31b, a middle terminal end point 31c, a first terminal edge 32a, and a second terminal edge 32b. The first terminal end point 31a is located in one of radially outside terminal ends of the swirling flow generating ribbon 30. The second terminal end point 31b is located in the other of the radially outside terminal ends. The axial position of the first terminal end point 31a is coincident with that of the second terminal end point 31b. A terminal line L between the first terminal end point 31a and the second terminal end point 31b is perpendicular to an axial line O of the swirling flow generating ribbon 30. The middle terminal end point 31c is located on the axial line O of the swirling flow generating ribbon 30, and is in a position closer to a side where the gas-liquid two-phase fluid flows in than the first terminal end point 31a and the second terminal end point 31b.

The first terminal edge 32a of the swirling flow generating ribbon 30 connects the first terminal end point 31a and the middle terminal end point 31c. The second terminal edge 32b connects the second terminal end point 31b and the middle terminal end point 31c. Specifically, in the terminal end 31 of the swirling flow generating ribbon 30, a V shaped space or area is defined by the first terminal edge 32a, the second terminal edge 32b, and the terminal line L.

Further, each of the first terminal edge 32a and the second terminal edge 32b of the swirling flow generating ribbon 30 includes a folding back structure 33. The folding back structure 33 is configured to be folded back toward the side where the gas-liquid two-phase fluid flows in. As shown in FIG. 5, the folding back structure 33 includes a first folding back piece 33a and a second folding back piece 33b. The first folding back piece 33a is formed by folding back the tips of the first terminal edge 32a and the second terminal edge 32b toward a helical surface 30a of the swirling flow generating ribbon 30. The second folding back piece 33b is formed by folding back the tips of the first terminal edge 32a and the second terminal edge 32b toward the other helical surface 30b. The folding back structure 33 is formed between the middle terminal end point 31c and a position before the first terminal end point 31a, and between the middle terminal end point 31c and a position before the second terminal end point 31b. Thereby, a gap or clearance β is formed between both radial ends of the folding back structure 33 and the inner surface 21c of the inlet pipe 21 (see FIG. 2).

The swirling flow generating ribbon 30 is disposed in the first area 26A. However, at least the first terminal end point 31a and the second terminal end point 31b of the terminal end 31 are inserted into an area where the tapered surface 21d is formed on the inner surface 21c, that is the second area 26B.

The swirling flow generating ribbon 30 includes a starting portion 34 which is located in the side of the swirling flow generating ribbon 30 where the gas-liquid two-phase fluid flows in. At the starting portion 34, the swirling flow generating ribbon 30 includes a first starting point 34a, a second starting point 34b, and a middle starting point 34c. The first starting point 34a is located in one of radially outside starting ends of the swirling flow generating ribbon 30. The second starting point 34b is located in the other of radially outside starting ends of the swirling flow generating ribbon 30. The middle starting point 34c is located on the axial line O of the swirling flow generating ribbon 30. The axial position of middle starting point 34c is coincident with the axial positions of the first starting point 34a and the second starting point 34b. Specifically, the middle starting point 34c is set on the intersection of the axial line O and a starting line which connects the first starting point 34a and the second starting point 34b. The first starting point 34a, the second starting point 34b, and the middle starting point 34c are aligned in the radial direction of the swirling flow generating ribbon 30. The starting portion 34 of the swirling flow generating ribbon 30 extends in the direction of gravity.

Figure 6:
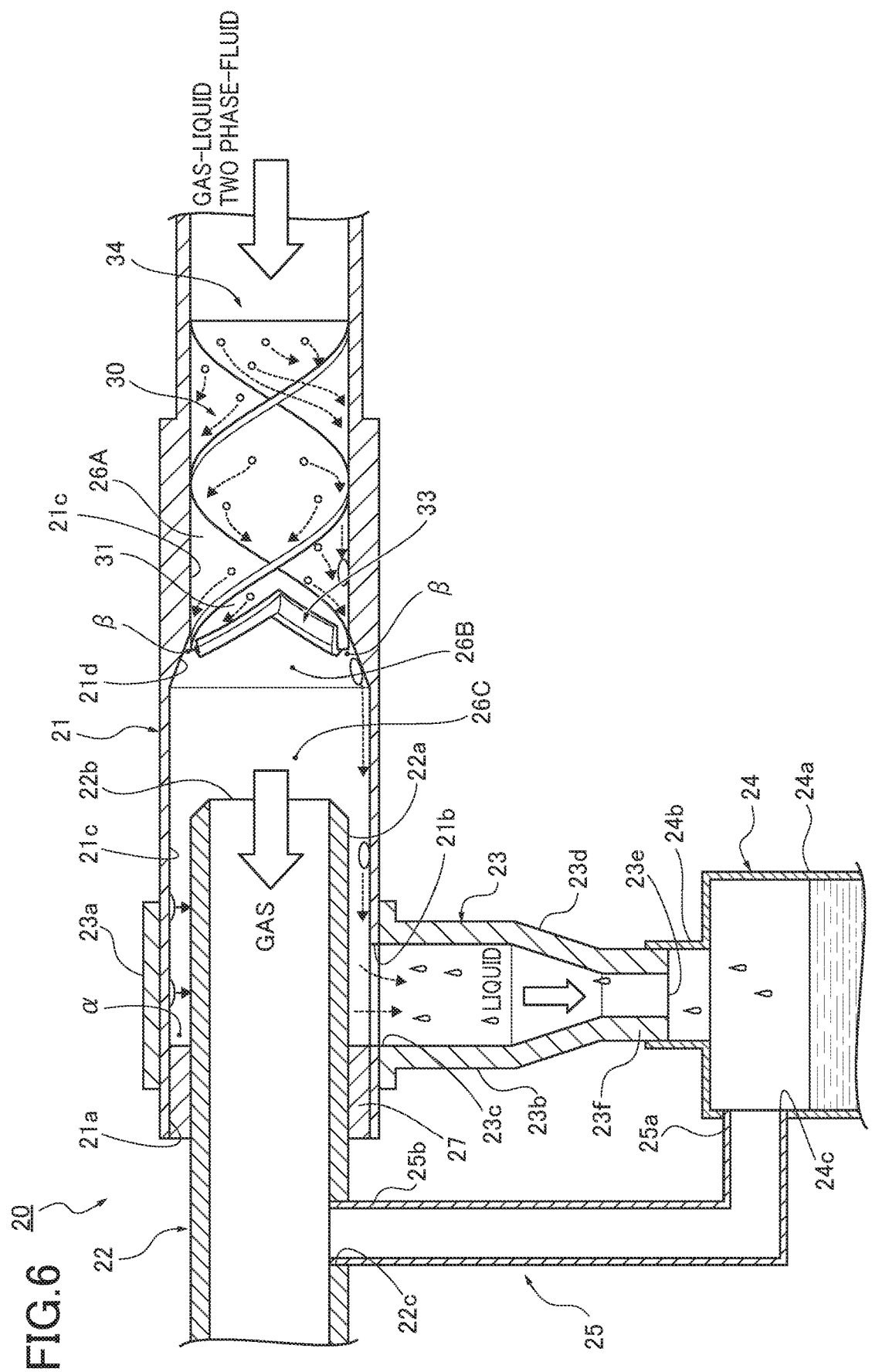
FIG. 6 is an overall explanatory diagram illustrating a flow of a gas-liquid two-phase fluid and flows of separated gas and liquid in the gas-liquid separator to which the swirling flow generator according to the First Embodiment is applied.
Figure 7:
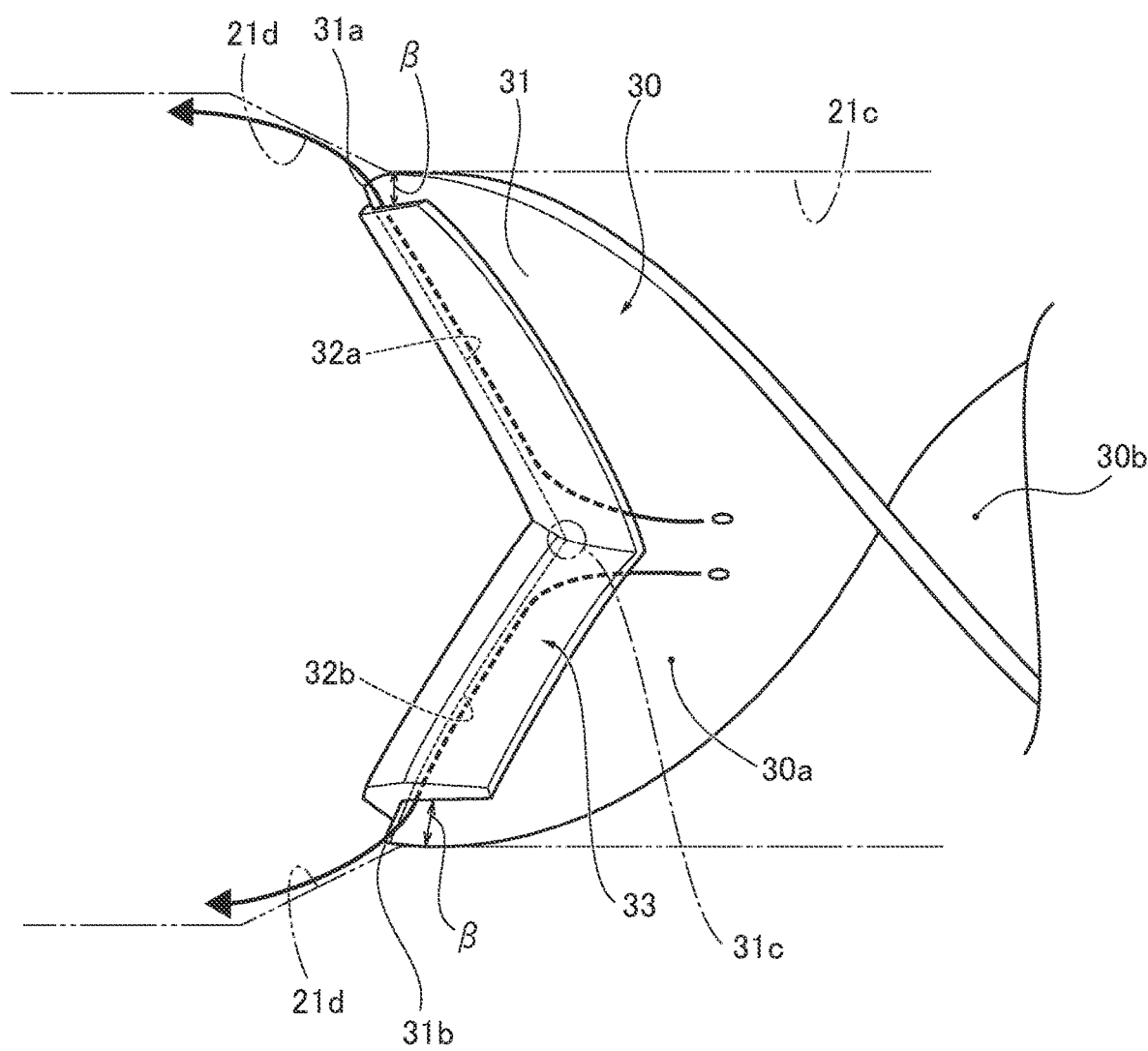
FIG. 7 is an explanatory diagram illustrating a flow of the liquid attached to the swirling flow generating ribbon at a terminal end of the ribbon in the swirling flow generator according to the First Embodiment.

Now, the gas-liquid separation action of the swirling flow generator for gas-liquid separation in the First Embodiment will be described. FIG. 6 is an overall explanatory diagram illustrating the flow of the gas-liquid two-phase fluid, and the flows of separated gas and liquid in the gas-liquid separator to which the swirling flow generator according to the First Embodiment is applied. FIG. 7 is explanatory diagram illustrating the flow of the liquid at the terminal end of the ribbon.

In the exhaust gas recirculation system S shown in FIG. 1, an outside air taken from the intake port 2a and the exhaust gas taken from the exhaust passage 3 via the low-pressure EGR passage 11 flow into the compressor 5a of the turbocharger 5 at a flow rate of 10 m/s to 100 m/s. At this time, moisture is contained in the outside air and the exhaust gas. These gases (the outside air and the exhaust gas) are cooled in the EGR cooler 13 so that the moisture is condensed into particulate liquid as condensed water, and the liquid is mixed with the gas such as air to form the gas-liquid two-phase fluid.

In the gas-liquid separator 20 of the First Embodiment, as shown in FIG. 6, the flow of the gas-liquid two-phase fluid turns into a swirling flow when the gas-liquid two-phase fluid in the inlet pipe 21 flows through the first area 26A along the swirling flow generating ribbon 30. Then, the centrifugal force is applied by the swirling flow, and the liquid having larger weight (mass) is guided toward the inner surface 21c of the inlet pipe 21 by the centrifugal force. The helical surfaces 30a, 30b of the swirling flow generating ribbon 30 are inclined relative to the flow direction of the gas-liquid two-phase fluid. Accordingly, the liquid contained in the gas-liquid two-phase fluid collides with the helical surfaces 30a, 30b and coheres, facilitating the formation of droplets.

Then, the liquid guided toward the inner surface 21c coheres to become droplets and separated from the gas. The liquid separated from the gas flows from the second area 26B to the third area 26C by the swirling flow while the separated liquid is attached to the inner surface 21c. The liquid reached the third area 26C flows downward through the drain port 21b formed in the third area 26C by its own weight. Subsequently, the liquid flows into the second pipe member 23b through the connection opening 23c of the drainpipe 23, and flows along the second pipe member 23b. Then, the liquid flows out of the second pipe member 23b through the tip opening 23e and flows into the tank body 24a to be retained therein.

In addition, the gas flowing through the inlet pipe 21 flows into the inner pipe 22 from the opening 22b open in the axial direction. At this time, the more the liquid moves downstream in the flow direction of the gas-liquid two-phase fluid, the more the liquid is separated from the gas. Subsequently, the gas flows to the compressor 5a of the turbocharger 5 through the inner pipe 22. Here, the outer dial of the inner pipe 22 is smaller than the inner diameter of the third area 26C of the inlet pipe 21. The liquid attached to the inner surface 21c of the inlet pipe 21 is thereby prevented from flowing in the inner pipe 22. Further, the exhaust port 21a of the inlet pipe 21 is provided with the ring member 27 that fills the clearance α between the inlet pipe 21 and the inner pipe 22. Therefore, the ring member 27 prevents the gas from leaking from the exhaust port 21a of the inlet pipe 21 so that the gas separated from the gas-liquid two-phase fluid can smoothly flow into the inner pipe 22.

Further, the liquid is turned to droplets by contacting the helical surfaces 30a, 30b of the swirling flow generating ribbon 30. The liquid in the form of droplets flows radially outward of the swirling flow generating ribbon 30 by the swirling flow and is guided to the inner surface 21c while attached to the helical surfaces 30a, 30b. At that time, the liquid in the form of droplets flows downstream of the flow direction of the gas-liquid two-phase fluid and also flows radially outward of the swirling flow generating ribbon 30.

At the terminal end 31 of the swirling flow generating ribbon 30, the liquid reached the first terminal edge 32a or the second terminal edge 32b while attached to the helical surfaces 30a, 30b flows radially outward of the swirling flow generating ribbon 30 along the first terminal edge 32a or the second terminal edge 32b and is guided toward the inner surface 21c of the inlet pipe 21 as shown in FIG. 7 with arrows.

Specifically, in the first terminal edge 32a, the first terminal end point 31a which is set radially outward of the swirling flow generating ribbon 30 is located downstream of the flow direction of the gas-liquid two-phase fluid from the middle terminal end point 31c which is located on the axial line O of the swirling flow generating ribbon 30. Also, in the second terminal edge 32b, the second terminal end point 31b which is set radially outward of the swirling flow generating ribbon 30 is located downstream of the flow direction of the gas-liquid two-phase fluid from the middle terminal end point 31c which is located on the axial line O of the swirling flow generating ribbon 30. The liquid attached to the helical surfaces 30a, 30b of the swirling flow generating ribbon 30 flows downstream of the flow direction of the gas-liquid two-phase fluid and also flows radially outward of the swirling flow generating ribbon 30 by the swirling flow.

Therefore, the extending directions of the first terminal edge 32a and the second terminal edge 32b are substantially coincident with the flow directions moving directions) of the liquid by the swirling flow while attached to the swirling flow generating ribbon 30. Thereby, in the terminal end 31 of the swirling flow generating ribbon 30, the liquid attached to the helical surfaces 30a, 30b is guided to the inner surface 21c of the inlet pipe 21 while kept being attached to the first and second terminal edges 32a, 32b. Therefore, even the attached liquid in the vicinity of the axial line O of the swirling flow generating ribbon 30 can be prevented from re-scattering to the gas from the terminal end 31. In addition, it is possible to improve the separation performance of the liquid and to improve the collection rate of the liquid. Further, the flow of the gas is not inhibited and the gas flow resistance can be suppressed so as not to increase since there is no need to use a baffle, a filter or the like for separating the liquid.

Moreover, in the First Embodiment, each of the first terminal edge 32a and the second terminal edge 32b is provided with the folding back structure 33 which is folded back toward the side where the gas-liquid two-phase fluid flows in. The folding back structure 33 can prevent the liquid reached the first terminal edge 32a or the second terminal edge 32b while attached to the helical surfaces 30a, 30b from flowing downstream of the flow direction of the gas-liquid two-phase fluid. Specifically, the liquid flows radially outward of the swirling flow generating ribbon 30 through the gap or clearance between the first terminal edge 32a and the first folding back piece 33a or the gap or clearance between the second terminal edge 32b and the second folding back piece 33b. Thereby, it is possible to prevent the liquid from being away from the first and second terminal edges 32a, 32b. Also, it is possible to guide the liquid to the inner surface 21c of the inlet pipe 21 and to improve the separation performance of the liquid.

Further, in the First Embodiment, the folding back structure 33 includes the first folding back piece 33a folded back toward the helical surface 30a of the swirling flow generating ribbon 30, and the second folding back piece 33b folded back toward the helical surface 30b. Therefore, the liquid can be prevented from being away from the first and second terminal edges 32a, 32b even when the liquid is attached to the helical surface 30a or the helical surfaces 30b of the swirling flow generating ribbon 30.

In addition, the folding back structure 33 is formed between the middle terminal end point 31c and the position before the first terminal end point 31a, and also formed between the middle terminal end point 31c and the position before the second terminal end point 31b. Thereby, the gap β is formed between both radial ends of the folding back structure 33 and the inner surface 21c of the inlet pipe 21. Therefore, the liquid prevented from flowing downstream of the flow direction of the gas-liquid two-phase fluid by the folding back structure 33 can flow downstream of the flow direction of the gas-liquid two-phase fluid at the radial ends of the folding back structure 33 through the gap β. Thereby, it is possible to prevent the liquid from resided within the gap between the first terminal edge 32a and the first folding back piece 33a, and/or the gap between the second terminal edge 32b and the second folding back piece 33b. Also, it is possible to immediately guide the liquid to the inner surface 21c of the inlet pipe 21.

In the First Embodiment, the inner surface 21c of the inlet pipe 21 includes the second area 26B provided with the tapered surface 21d which gradually increases the inner diameter of the inlet pipe 21 in the flow direction of the gas-liquid two-phase fluid. At least the first terminal end point 31a and the second terminal end point 31b of the terminal end 31 of the swirling flow generating ribbon 30 are inserted into the second area 26B provided with the tapered surface 21d. Therefore, the liquid reached the first terminal end point 31a or the second terminal end point 31b along the first and second terminal edges 32a, 32b flows to the tapered surface 21d. Thereby, the liquid guided to the inner surface 21c along the first and second terminal edges 32a, 32b can smoothly flow to the drain port 21b, which results in facilitating the guidance and separation of the liquid.

Now, effects will be described. According to the swirling flow generator for gas-liquid separation in the First Embodiment, following effects can be obtained.

(1) A swirling flow generator for gas-liquid separation for separating a liquid and a gas from gas-liquid two-phase fluid by centrifugal force, the swirling flow generator including:

a swirling flow generating ribbon 30 for swirling the gas-liquid two-phase fluid, the swirling flow generating ribbon formed from a helically twisted plate member and swirls the gas-liquid two-phase fluid; and a pipe (inlet pipe 21) that receives the swirling flow generating ribbon 30 and includes an inner surface 21c to which a separated liquid is guided, wherein the swirling flow generating ribbon 30 includes, in a terminal end at a side where the gas-liquid two-phase fluid flows out, the first terminal end point 31a that is in an end (a first end) of radially outward ends of the swirling flow generating ribbon 30;

the second terminal end point 31b that is in another end (a second end) of radially outward ends of the swirling flow generating ribbon 30;

the middle terminal end point 31c that is on the axial line O of the swirling flow generating ribbon 30 and closer to a side where the gas-liquid two-phase fluid flows in than the first terminal end point 31a and the second terminal end point 31b;

the first terminal edge 32a connecting the first terminal end point 31a and the middle terminal end point 31c, and the second terminal edge 32b connecting the second terminal end point 31b and the middle terminal end point 31c.

Thereby, the liquid attached to the swirling flow generating ribbon 30 can be prevented from re-scattering into the gas at the terminal end 31, and the separation performance of the liquid can be improved.

(2) The swirling flow generating ribbon 30 includes the folding back structures 33 in the first terminal edge 32a and the second terminal edge 32b. Each of the folding back structures 33 is folded back toward the side where the gas-liquid two-phase fluid flows in. Thereby, in addition to the effect (1), the liquid can be guided to the inner surface 21c of the inlet pipe 21 while prevented from being away from the first terminal edge 32a or the second terminal edge 32b. Also, the separation performance of the liquid can be further improved.

(3) The folding back structure 33 is formed between the middle terminal end point 31c and a position before the first terminal end point 31a, and between the middle terminal end point 31c and a position before the second terminal end point 31b. Thereby, in addition to the effect (2), the liquid can be guided to the inner surface 21c of the inlet pipe 21 while prevented from resided within the gap between the first terminal edge 32a and the first folding back piece 33a, and/or the gap between the second terminal edge 32b and the second folding back piece 33b.

(4) The inner surface 21c of the pipe (inlet pipe 21) includes the tapered surface 21d which gradually increases an inner diameter of the pipe in a flow direction of the gas-liquid two-phase fluid. At least the first terminal end point 31a and the second terminal end point 31b of the swirling flow generating ribbon 30 are inserted into an area (the second area 26B) where the tapered surface 21d is provided. Thereby, in addition to any one of the above effects (1) to (3), the liquid guided to the inner surface 21c along the first and second terminal edges 32a, 32b can smoothly flow to the drain port 21b, which facilitates the guidance and separation of the liquid.

Second Embodiment

In a swirling flow generator for gas-liquid separation according to the Second Embodiment, a swirling flow generating ribbon includes a ribbon cooling structure or ribbon cooler for cooling a surface (helical surface) and an inlet pipe includes a pipe cooling structure or pipe cooler.

Figure 8:
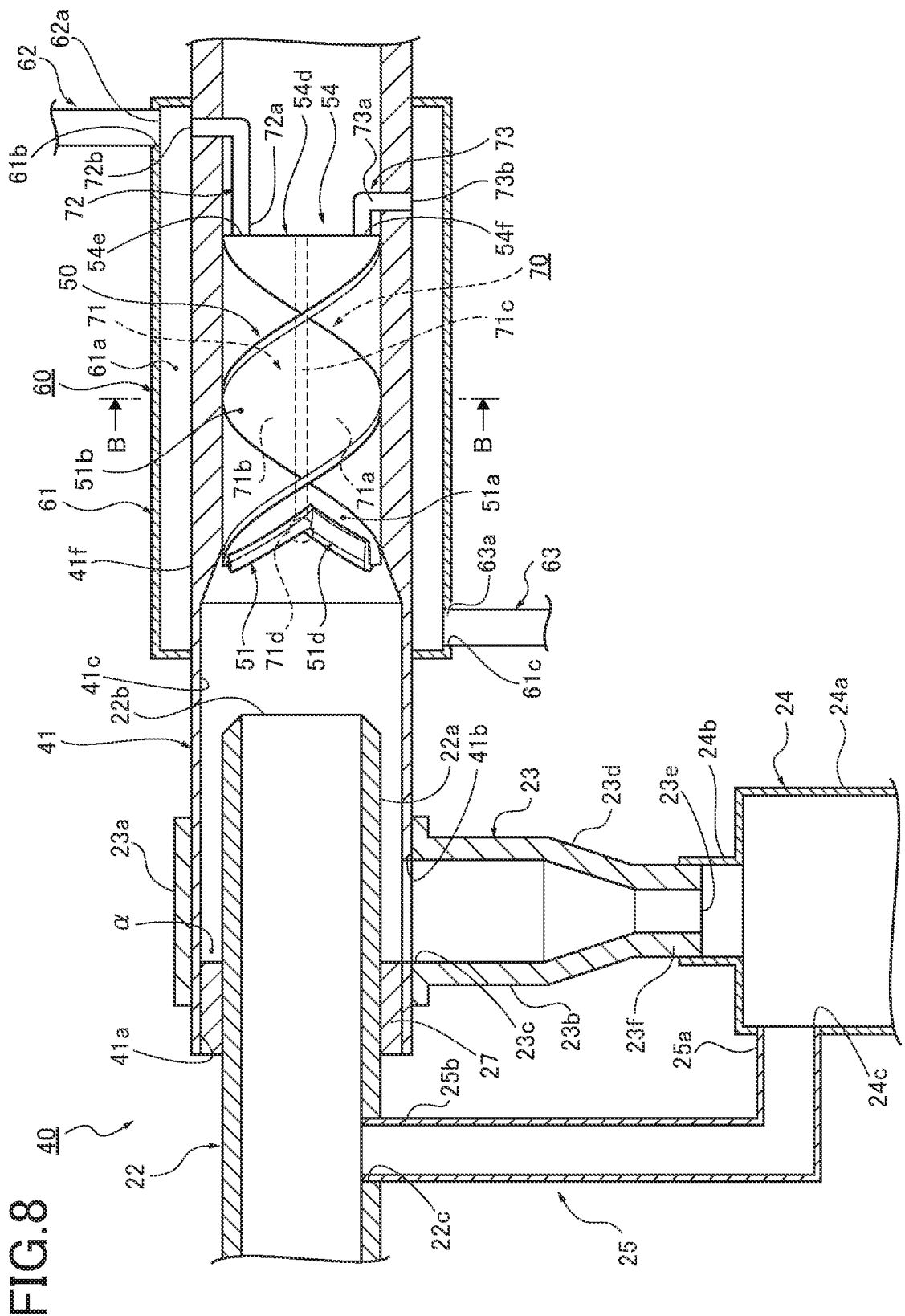
FIG. 8 is a cross sectional view illustrating a gas-liquid separator to which a swirling flow generator according to the Second Embodiment is applied.
Figure 9:
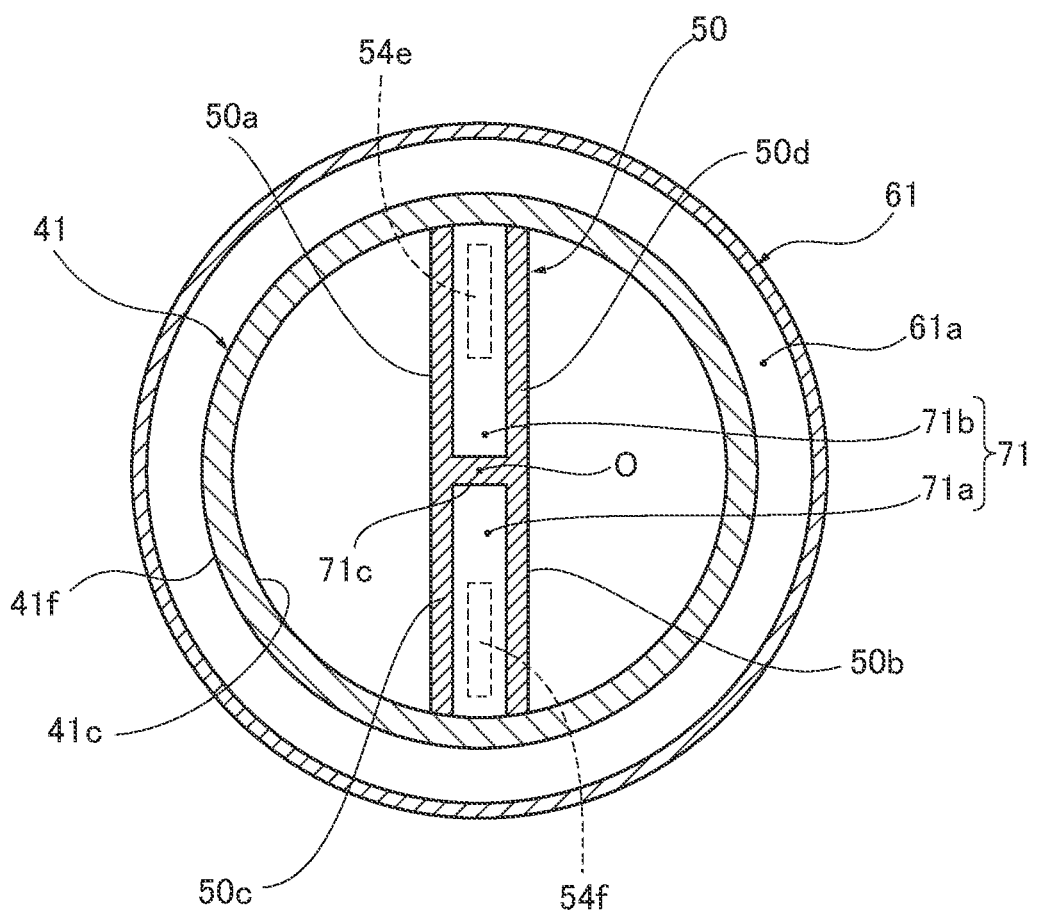
FIG. 9 is a cross sectional view along a line B-B in FIG. 8.

First, the configuration of a gas-liquid separator will be described. FIG. 8 is a cross sectional view illustrating a gas-liquid separator to which a swirling flow generator for gas-liquid separation according to the Second Embodiment is applied. FIG. 9 is a cross sectional view along a line B-B in FIG. 8. Hereinafter, the configuration of a swirling flow generator for gas-liquid separation according to the Second Embodiment will be described with reference to FIGS. 8, 9. Note that the same numbers are applied to the configurations which are the same as those in the First Embodiment, and the detailed description thereof will be omitted.

As shown in FIG. 8, the gas-liquid separator 40 according to the Second Embodiment includes an inlet pipe 41 (pipe), an inner pipe 22, a drainpipe 23, a reservoir tank 24, a bypass pipe 25, and a swirling flow generating ribbon 50.

The inlet pipe 41 is in communication with an intake port (not shown) and a low-pressure EGR valve (not shown) at an upstream end (right side in FIG. 8) in the flow direction of the gas-liquid two-phase fluid. The inlet pipe 41 includes the swirling flow generating ribbon 50 therewithin. An exhaust port 41a and a drain port 41b are provided downstream of the flow direction of the gas-liquid two-phase fluid from the swirling flow generating ribbon 50. Further, the inlet pipe 41 in the Second Embodiment includes a pipe cooling structure or pipe cooler 60 for cooling an inner surface 41c of the inlet pipe 41. The pipe cooler 60 includes a cooling water circulation pipe 61, a first cooling water pipe 62, and a second cooling water pipe 63.

The cooling water circulation pipe 61 is a hollow cylindrical pipe having an inner diameter lager than the inlet pipe 41. The inlet pipe 41 has a double pipe structure in which the inlet pipe 41 extends through the cooling water circulation pipe 61 such that a part of the inlet pipe 41 is surrounded by the cooling water circulation pipe 61. Thereby, a pipe cooling water circulation space 61a, which is a space surrounding the outer surface of the inlet pipe 41, is formed between the inlet pipe 41 and the cooling water circulation pipe 61. The cooling water circulation pipe 61 surrounds a part of the inlet pipe 41 in the axial direction. The surrounded part includes an area in which the swirling flow generating ribbon 50 is disposed and also an upstream area thereof.

The first cooling water pipe 62 is a pipe through which cooling water (refrigerant) flows to the pipe cooling water circulation space 61a. An end 62a of the first cooling water pipe 62 is connected to a first opening 61b formed in the cooling water circulation pipe 61, and the other end (not shown) is connected between an evaporator and an expansion valve of a refrigerating cycle of a vehicle air conditioner (not shown). The first opening 61b is an opening which is radially opened in the pipe cooling water circulation space 61a. Specifically, the first opening 61b is formed by making a circular hole on the circumferential surface of the cooling water circulation pipe 61. As shown in FIG. 8, the first opening 61b is at a location upstream in the flow direction of the gas-liquid two-phase fluid relative to the swirling flow generating ribbon 50 and is formed upward in the direction of gravity.

The second cooling water pipe 63 is a pipe through which the cooling water (refrigerant) from the pipe cooling water circulation space 61a flows. An end 63a of the second cooling water pipe 63 is connected to a second opening 61c formed in the cooling water circulation pipe 61, and the other end (not shown) is connected between the compressor and the evaporator of the refrigerating cycle of the vehicle air conditioner (not shown). The second opening 61c is radially open in the pipe cooling water circulation space 61a. Specifically, the second opening 61c is formed by making a circular hole on the circumferential surface of the cooling water circulation pipe 61. As shown in FIG. 8, the second opening 61c is at a location downstream in the flow direction of the gas-liquid two-phase fluid relative to the swirling flow generating ribbon 50 and is formed downward in the direction of gravity.

Note that the locations of the first opening 61b and the second opening 61c are not limited to ones shown in FIG. 8 but the first opening 61b and the second opening 61c may be formed in any locations. For example, the first opening 61b may be formed downstream in the flow direction of the gas-liquid two-phase fluid relative to the swirling flow generating ribbon 50, and the second opening 61c may be formed upstream in the flow direction of the gas-liquid two-phase fluid relative to the swirling flow generating ribbon 50. Further, the opening directions of the first and second openings 61b, 61c are not necessarily in the direction of gravity since the cooling water circulates under the application of water pressure.

The basic configuration of the swirling flow generating ribbon 50 in the Second Embodiment is the same as that of the swirling flow generating ribbon 30 in the First Embodiment. Accordingly, a configuration of the Second Embodiment different from that of the First Embodiment will be described hereinafter.

In the Second Embodiment, the swirling flow generating ribbon 50 includes a ribbon cooling structure or ribbon cooler 70 for cooling a helical surface 50a and another helical surface 50b of the swirling flow generating ribbon 50. The ribbon cooler 70 includes a cooling water circulation space 71, a third cooling water pipe 72, and a fourth cooling water pipe 73.

As shown in FIG. 9, the plate member which forms the swirling flow generating ribbon 50 has a double stricture which consists of a first plate member 50c including the helical surface 50a and a second plate member 50d including the helical surface 50b. The cooling water circulation space 71 is defined between the first plate member 50c and the second plate member 50d. Specifically, the cooling water circulation space 71 is formed inside of the swirling flow generating ribbon 50. The cooling water circulation space 71 is provided with a partition wall 71c along the axial line O of the swirling flow generating ribbon 50. The partition wall 71c divides the cooling water circulation space 71 into a first space 71a and a second space 71b. The first space 71a and the second space 71b are in communication with each other via a gap or clearance 71d. The clearance 71d is formed between the partition wall 71c and a terminal end surface 51d which closes a terminal end 51 of the swirling flow generating ribbon 50.

The third cooling water pipe 72 is a pipe through which cooling water (refrigerant) flows to the cooling water circulation space 71. A first end 72a of the third cooling water pipe 72 is connected to a third opening 54e formed on a starting end surface 54d which closes a starting end 54 of the swirling flow generating ribbon 50. A second end 72b of the third cooling water pipe 72 radially extends through the inlet pipe 41 to communicate with the pipe cooling water circulation space 61a. The third opening 54e is formed by making a rectangular hole on the starting end surface 54d and is open to the first space 71a in the axial direction of the cooling water circulation space 71. The second end 72b of the third cooling water pipe 72 extends through the inlet pipe 41 at a location where the second end 72b faces the first opening 61b of the cooling water circulation pipe 61.

The fourth cooling water pipe 73 is a pipe through which the cooling water (refrigerant) discharged from the cooling water circulation space 71 flows. A first end 73a of a fourth cooling water pipe 73 is connected to a fourth opening 54f formed on the starting end surface 54d which closes the starting end 54 of the swirling flow generating ribbon 50. A second end 73b of the fourth cooling water pipe 73 radially extends through the inlet pipe 41 to communicate with the pipe cooling water circulation space 61a. The fourth opening 54f is formed by making a rectangular hole on the starting end surface 54d and is open to the second space 71b in the axial direction of the cooling water circulation space 71. The second end 73b of the fourth cooling water pipe 73 extends through the inlet pipe 41 at a location downstream of the flow direction of the gas-liquid two-phase fluid from the first opening 61b of the cooling water circulation pipe 61 and downward in the direction of gravity.

Figure 10:
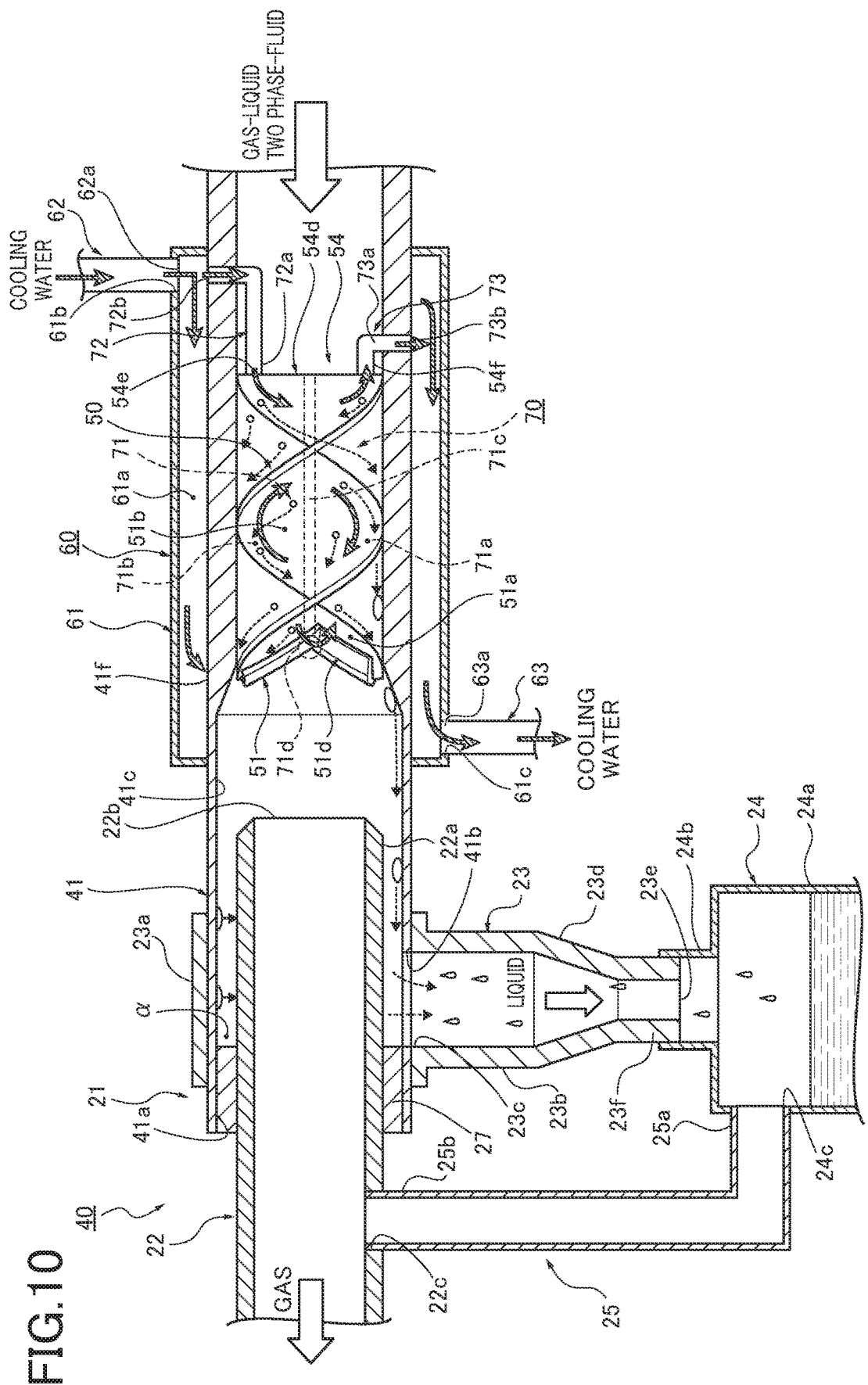
FIG. 10 is an overall explanatory diagram illustrating a flow of a gas-liquid two-phase fluid and a flow of cooling water in the gas-liquid separator to which the swirling flow generator according to the Second Embodiment is applied.

Next, the operation will be described. FIG. 10 is an overall explanatory diagram illustrating a flow of a gas-liquid two-phase fluid and a flow of cooling water in the gas-liquid separator to which the swirling flow generator according to the Second. Embodiment is applied. The operation for facilitating coherence of liquid in the Second Embodiment will be hereinafter described with reference to FIG. 10.

In the gas-liquid separator 40 of the Second Embodiment, similar to the First Embodiment, the gas-liquid two-phase fluid through the inlet pipe 41 swirls while flowing along the swirling flow generating ribbon 50 to generate centrifugal force so that the liquid is guided to the inner surface 41c of the inlet pipe 41. However, when the flow rate of the gas-liquid two-phase fluid is low, the flow rate of the swirling flow also becomes low, which weakens centrifugal force to be generated. In this case, it is difficult to guide the liquid to the inner surface 41c of the inlet pipe 41 so that the coherence of the liquid is not facilitated and the liquid may not be separated from the gas as desired.

On the other hand, in the Second Embodiment, the gas-liquid separator 40 includes the pipe cooler 60, the inlet pipe 41 extends through the cooling water circulation pipe 61, and the pipe cooling water circulation space 61a is formed between the inlet pipe 41 and the cooling water circulation pipe 61. In addition, the pipe cooling water circulation space 61a is connected to the first and second cooling water pipes 62, 63 which are in turn connected to the refrigerating cycle of the vehicle air conditioner (not shown).

When the cooling water circulates in the refrigerating cycle, a part of the cooling water discharged from the expansion valve in the form of mist having low temperature and low pressure flows into the pipe cooling water circulation space 61a through the first cooling water pipe 62. The cooling water entered the pipe cooling water circulation space 61a flows in the axial direction of the inlet pipe 41, flows out of the pipe cooling water circulation space 61a through the second opening 61c, and returns to the refrigerating cycle via the second cooling water pipe 63.

The cooling water in the form of mist having low temperature and low pressure absorbs ambient heat and vaporizes while flowing through the pipe cooling water circulation space 61a. Accordingly, the inlet pipe 41 and the cooling water circulation pipe 61 are cooled.

The gas-liquid two-phase fluid flows through the inlet pipe 41. When the gas-liquid two-phase fluid contacts the inner surface 41c of the inlet pipe 41, the heat of the gas-liquid two-phase fluid is transferred to the inlet pipe 41 and absorbed so that the gas-liquid two-phase fluid is cooled. Accordingly, the temperature of the gas-liquid two-phase fluid is decreased so as to facilitate the liquid contained in the gas-liquid two-phase fluid to become droplets. Further, by facilitating the liquid to be droplets, the weight of each droplet becomes heavier so that the droplets (liquid) can be guided to the inner surface 41c of the inlet pipe 41 even if the centrifugal force caused by the swirling flow is relatively weak. As a result, it is possible to improve the separation rate of the liquid from the gas-liquid two-phase fluid.

Further, the gas-liquid separator 40 of the Second Embodiment includes the ribbon cooler 70. Specifically, the swirling flow generating ribbon 50 disposed within the inlet pipe 41 has the double structure consisting of the first plate member 50c and the second plate member 50d, and the cooling water circulation space 71 is formed between the first plate member 50c and the second plate member 50d. Then, the cooling water circulation space 71 is in communication with the pipe cooling water circulation space 61a via the third cooling water pipe 72 and the fourth cooling water pipe 73.

When the cooling water circulates in the refrigeration cycle of the vehicle air conditioner (not shown), a part of the cooling water flows into the pipe cooling water circulation space 61*a* and then flows into the first space 71*a* of the cooling water circulation space 71 via the third cooling water pipe 72. The cooling water that has entered the first space 71*a* flows toward the terminal end 51 from the starting end 54 of the swirling flow generating ribbon 50, flows into the second space 71*b* via the clearance 71*d* to which the partition wall 71*c* does not extend, and flows from the terminal end 51 to the starting end 54 within the second space 71*b*. Then, the cooling water that has reached the starting end 54 is discharged to the pipe cooling water circulation space 61*a* via the fourth opening 54*f* formed on the starting end 54 and the fourth cooling water pipe 73.

In this embodiment, the second end 72*b* of the third cooling water pipe 72 extends through the inlet pipe 41 at the location facing the first opening 61*b* which is formed in the cooling water circulation pipe 61. The second end 73*b* of the fourth cooling water pipe 73 extends through the inlet pipe 41 at the location downstream of the flow direction of the cooling water from the first opening 61*b*. Accordingly, the cooling water from the pipe cooling water circulation space 61*a* can flow from the first space 71*a* to the second space 71*b*.

The cooling water flown into the cooling water circulation space 71 absorbs the ambient heat and vaporizes while flowing through the cooling water circulation space 71 to cool the helical surfaces 50*a*, 50*b* which are surfaces of the swirling flow generating ribbon 50. Accordingly, when the gas-liquid two-phase fluid flowing through the inlet pipe 41 contacts the helical surfaces 50*a*, 50*b* of the swirling flow generating ribbon 50, the heat of the gas-liquid two-phase fluid is transferred to the swirling flow generating ribbon 50 so that the swirling flow generating ribbon 50 is cooled. Therefore, it is possible to facilitate the liquid contained in the gas-liquid two-phase fluid to turn into droplets and to improve the separation rate of the liquid from the gas-liquid two-phase fluid.

Now, effects will be described. According to the swirling flow generator for gas-liquid separation in the Second Embodiment, following effects can be obtained.

(5) The swirling flow generating ribbon 50 includes the ribbon cooler 70 that cools the surface (helical surfaces 50*a*, 50*b*) of the ribbon. Thereby, in addition to any one of the above effects (1) to (4), it is possible to collect the liquid which can flow downward by its own weight before the gas-liquid two-phase fluid swirls, and to improve the separation rate of the liquid.

(6) The pipe (inlet pipe 41) includes the pipe cooler 60 that cools at least a portion of the inlet pipe where the swirling flow generating ribbon 50 is disposed. Thereby, in addition to any one of the above effects (1) to (5), it is possible to decrease the temperature of the gas-liquid two-phase fluid flowing through the inlet pipe 41, to facilitate the coherence of the liquid and to improve the separation rate of the liquid.

Although the swirling flow generator for gas-liquid separation of the present disclosure has been described based on the First Embodiment and the Second Embodiment, the specific configurations are not limited to the First Embodiment and the Second Embodiment, and modifications and/or additions of the configurations may be made without departing from the gist of the invention recited in the claims.

Figure 11A:
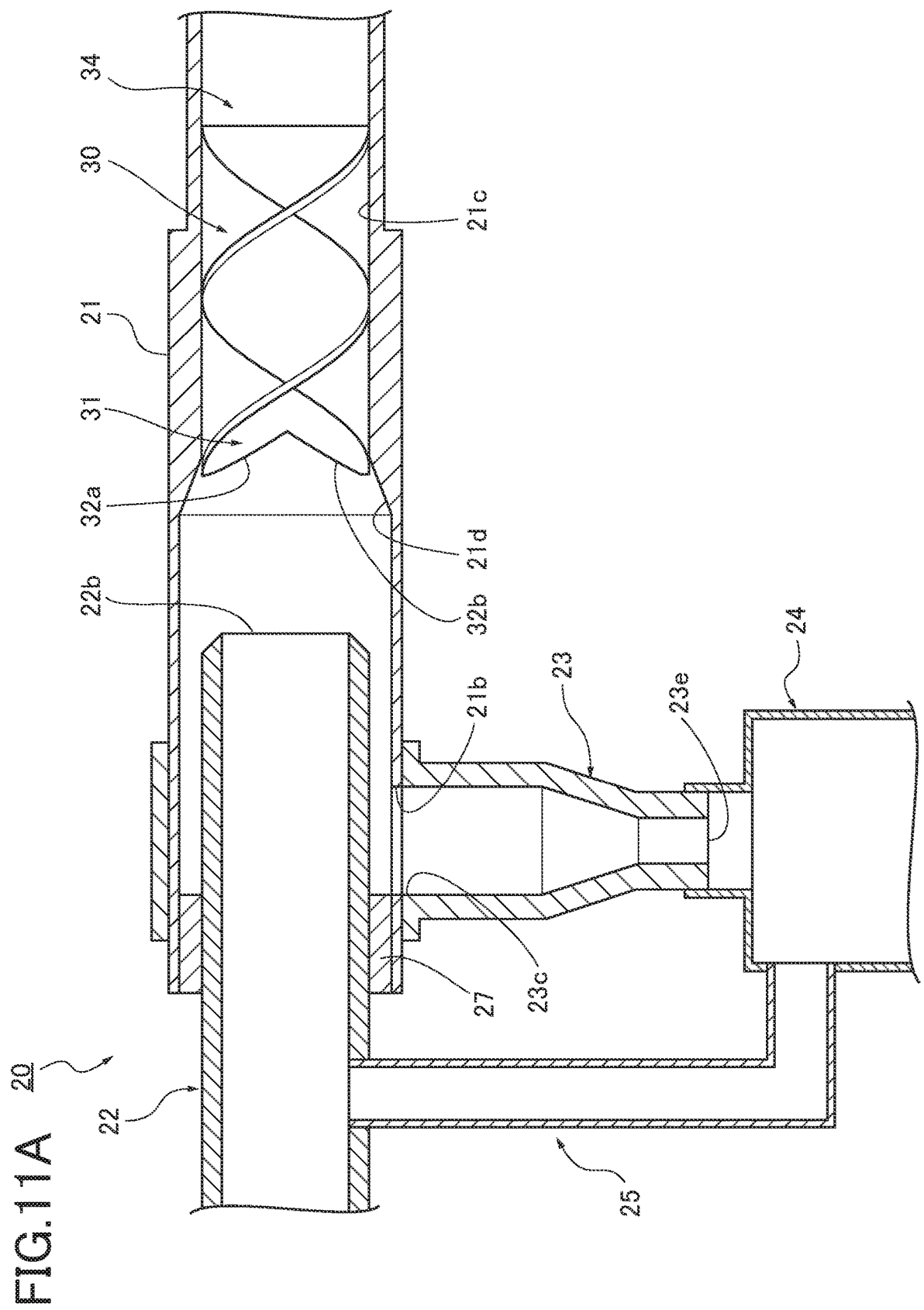
FIG. 11A is a cross sectional view illustrating a swirling flow generator according to the First Modified Example.

In the First Embodiment, the folding back structures 33 are provided on the first terminal edge 32*a* and the second terminal edge 32*b* of the terminal end 31 of the swirling flow generating ribbon 30. However, the present disclosure is not limited to the above, but the folding back structures may not be formed as shown in FIG. 11A, for example. Even in this case, the extending directions of the first and second terminal edges 32*a*, 32*b* are substantially coincident with the flow direction of the liquid forced to flow by the swirling flow while attached to the swirling flow generating ribbon 30. Therefore, it is possible to guide the liquid attached to the helical surfaces 30*a*, 30*b* to the inner surface 21*c* of the inlet pipe 21 in the terminal end 31 of the swirling flow generating ribbon 30.

Figure 11B:
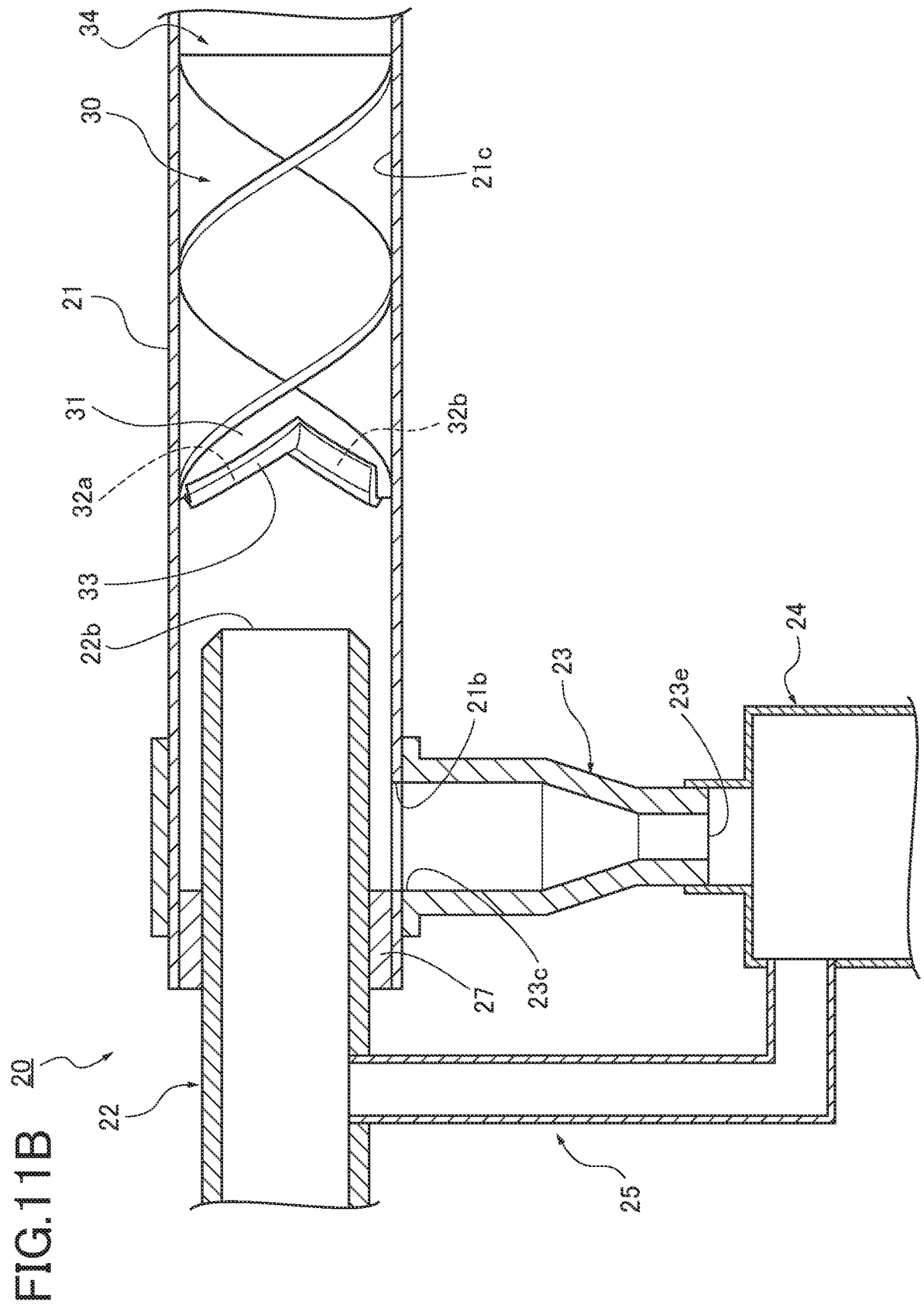
FIG. 11B is a cross sectional view illustrating a swirling flow generator according to the Second Modified Example.

Further, in the First Embodiment, the tapered surface 21*d* is formed on the inner surface 21*c* of the inlet pipe 21, and the second area 26B provided with the tapered surface 21*d* receives at least the first and second terminal end points 31*a*, 31*b* of the swirling flow generating ribbon 30. However, the tapered surface 21*d* may not be formed as shown in FIG. 11B and FIG. 11C. Even in this case, the liquid separated from the gas-liquid two-phase fluid can flow into the drain port 21*b* by the swirling flow.

Figure 12A:
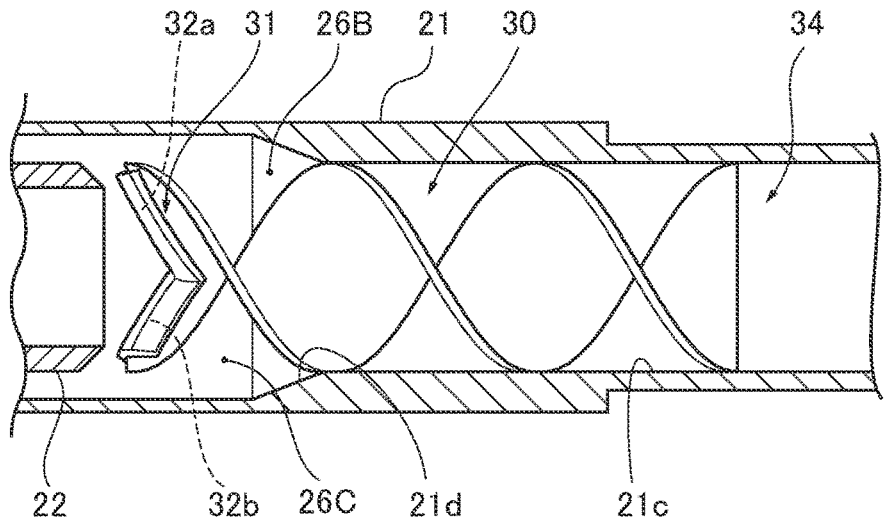
FIG. 12A is a cross sectional view illustrating a swirling flow generator according to the Fourth Modified Example.

In addition, as shown in FIG. 12A, the swirling flow generating ribbon 30 disposed in the first area 26A may extend such that the terminal end 31 is located in the third area 26C of the inlet pipe 21 in the vicinity of the opening 22*b* of the inner pipe 22.

Figure 12B:
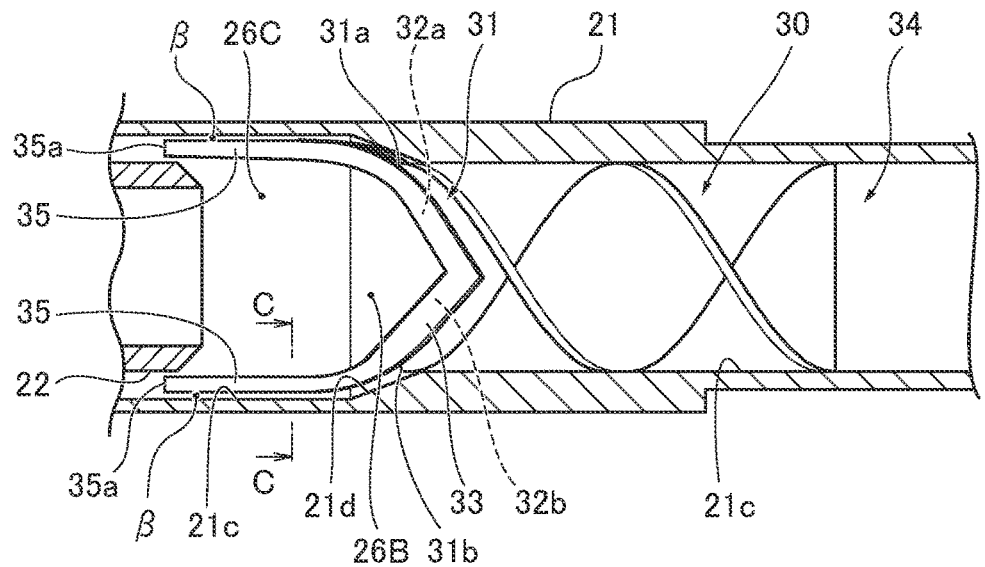
FIG. 12B is a cross sectional view illustrating a swirling flow generator according to the Fifth Modified Example.
Figure 12C:
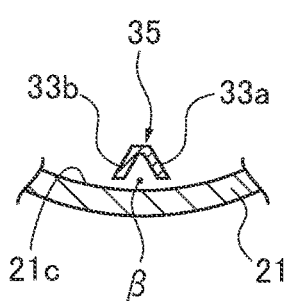
FIG. 12C is a cross sectional view along a line C-C shown in FIG. 12B.

Moreover, as shown in FIG. 12B, the second area 26B provided with the tapered surface 21*d* receives the first and second terminal end points 31*a*, 31*b* of the swirling flow generating ribbon 30, and both radial ends of the folding back structures 33 provided in the first and second terminal edges 32*a*, 32*b* of the swirling flow generating ribbon 30 may be extended along the inner surface 21*c* of the inlet pipe 21. Specifically, each radial end of the folding back structures 33 may include an extension 35 which is inserted into the third area 26C of the inlet pipe 21. The extension 35 is formed to have a V-shape cross section defined by the first and second folding back pieces 33*a*, 33*b* (see FIG. 12C). By extending the extensions 35 such that the tips 35*a* reach a location downstream from the opening 22*b* of the inner pipe 22, the liquid flown between the first folding back piece 33*a* and the second folding back piece 33*b* of the folding back structure 33 can be guided to the inner surface 21*c* without scattering in the inner pipe 22. In addition, the gaps β are maintained between the extensions 35 of the folding back structure 33 and the inner surface 21*c* of the inlet pipe 21 so that the liquid flowing along the folding back structure 33 can be smoothly guided to the inner surface 21*c*.

Further, in the First Embodiment, the starting portion 34 of the swirling flow generating ribbon 30 extends in the direction of gravity. However, the swirling flow generating ribbon 30 may be disposed such that the starting portion 34 horizontally extends relative to the direction of gravity, for example. In this case, it is possible for the liquid guided to the inner surface 21*c* in the inlet pipe 21 to easily flow downward by its own weight and to effectively prevent the liquid separated from the gas from re-scattering.

Further, in the First Embodiment, the first terminal edge 32*a* and the second terminal edge 32*b* are configured to extend straight to define the V-shaped space in e terminal end 31 of the swirling flow generating ribbon 30. However, the first terminal edge 32*a* and the second terminal edge 32*b* are not limited to the above. The first and second terminal edges 32*a*, 32*b* may be curved so that the terminal end 31 of the swirling flow generating ribbon 30 may have a U-shape as long as the middle terminal end point 31*c* is located in the side where the gas-liquid two-phase fluid flows in relative to the first terminal end point 31*a* and the second terminal end point 31*b*.

In addition, the axial position of the first terminal end point 31a is not necessarily coincident with that of the second terminal end point 31b, but one of the first and second terminal end points 31a, 31b may be located closer to the side where the gas-liquid two-phase fluid flows in than the other of the first and second terminal end points 31a, 31b. In this case, the terminal line L may not be perpendicular to the axial line O of the swirling flow generating ribbon 30. Further, the middle terminal end point 31c may be at a location radially deviated from the axial line O of the swirling flow generating ribbon 30 (at a location in the vicinity of the axial line O) as long as the middle terminal end point 31c is located closer to the side where the gas-liquid two-phase fluid flows in than the first terminal end point 31a and the second terminal end point 31b. In other words, the shape of the swirling flow generating ribbon 30 is not limited to the one shown in the First Embodiment. The locations of the terminal end points and/or the starting end points, and/or the shapes of the terminal edges may be set as desired as long as the first and second terminal end points 31a, 31b respectively set in the terminal ends radially outward of the swirling flow generating ribbon 30, the middle terminal end point 31c located closer to the side where the gas-liquid two-phase fluid flows in than the first and second terminal end points 31a, 31b, and the first and second terminal edges 32a, 32b connecting the first and second terminal end points 31a, 31b and the middle terminal end point 31c are included.

In addition, the gas-liquid separator 40 of the Second Embodiment includes the pipe cooler 60 for cooling the inlet pipe 41, and the ribbon cooler 70 for cooling the swirling flow generating ribbon 50. However, the gas-liquid separator 40 is not limited to the above. It is possible to cool the gas-liquid two-phase fluid and to improve the coherence of the liquid contained in the gas-liquid two-phase fluid with one of the coolers 60, 70. Moreover, in the Second Embodiment, the pipe cooler 60 and the ribbon cooler 70 use the refrigerant of the vehicle air conditioner as the cooling water but may use an engine coolant (LLC: Long Life Coolant), for example.

Further, in the First Embodiment, the gas-liquid separator 20 is installed in a so-called transverse direction in which the flow direction of the gas-liquid two-phase fluid is horizontal with respect to the direction of gravity. However, the installation direction of the gas-liquid separator 20 in the present disclosure is not limited to the above, but may be appropriately selected considering factors such as a layout in the exhaust gas recirculation system S. Further, in the First Embodiment, the starting portion 34 extends in the direction of gravity. However, the extending direction of the starting portion 34 is not limited to the above but may be appropriately selected considering factors such as the layout of the gas-liquid separator 20 in the exhaust gas recirculation system S.

Moreover, in the First Embodiment, the internal combustion engine 1 is the diesel engine mounted in the vehicle. However, the internal combustion engine 1 is not limited to the diesel engine but may be a gasoline engine.

Further, in the First Embodiment and the Second Embodiment, the swirling flow generator for gas-liquid separation of the present disclosure is applied to the exhaust gas recirculation system S of the internal combustion engine 1. However, the swirling flow generators for gas-liquid separation are not limited to the above but may be applied to a refrigeration cycle device, for example, to separate a gaseous refrigerant and a liquid refrigerant. In other words, the swirling flow generator for gas-liquid separation of the present disclosure can be applied to devices which separate the liquid and the gas from the gas-liquid two-phase fluid.

Moreover, the shape, the positions of the connection, and/or the diameter of each pipe (the inlet pipe, etc.) are not limited to ones in the First Embodiment and the Second Embodiment but may be selected as desired.

The invention claimed is:

1. A swirling flow generator for gas-liquid separation for separating a liquid and a gas from gas-liquid two-phase fluid by centrifugal force, the swirling flow generator comprising:
 a swirling flow generating ribbon for swirling the gas-liquid two-phase fluid, the swirling flow generating ribbon defined by a helically twisted plate member; and
 a pipe configured to receive the swirling flow generating ribbon, the pipe comprising an inner surface to which a separated liquid is to be guided,
 wherein the swirling flow generating ribbon comprises, in a terminal end at a first side where the gas-liquid two-phase fluid is to flow out,
 a first terminal end point that is in a first of radially outward ends of the swirling flow generating ribbon;
 a second terminal end point that is in a second of the radially outward ends of the swirling flow generating ribbon;
 a middle terminal end point that is on an axial line of the swirling flow generating ribbon and at a location closer to a second side where the gas-liquid two-phase fluid is to flow in than the first terminal end point and the second terminal end point;
 a first terminal edge connecting the first terminal end point and the middle terminal end point; and
 a second terminal edge connecting the second terminal end point and the middle terminal end point,
 wherein:
 the swirling flow generating ribbon comprises a folding back structure in the first terminal edge and the second terminal edge, the folding back structure being folded back toward the second side where the gas-liquid two-phase fluid is to flow in;
 the folding back structure comprises a first folding back piece and a second folding back piece; and
 the first folding back piece is defined by folding back tips of the first terminal edge and the second terminal edge toward a first helical surface of the swirling flow generating ribbon, and the second folding back piece is defined by folding back tips of the first terminal edge and the second terminal edge toward a second helical surface of the swirling flow generating ribbon.

2. The swirling flow generator according to claim 1, wherein the folding back structure is between the middle terminal end point and a position before the first terminal end point, and between the middle terminal end point and a position before the second terminal end point.

3. The swirling flow generator according to claim 1, wherein the inner surface of the pipe comprises a tapered surface that increases an inner diameter of the pipe in a flow direction of the gas-liquid two-phase fluid, and wherein at least the first terminal end point and the second terminal end point of the swirling flow generating ribbon are inserted into an area where the tapered surface is provided.

4. The swirling flow generator according to claim 1, wherein the swirling flow generating ribbon comprises a ribbon cooler for cooling a surface of the ribbon.

5. The swirling flow generator according to claim 1, wherein the pipe comprises a pipe cooler for cooling at least a portion of the pipe where the swirling flow generating ribbon is disposed.

* * * * *